(12) United States Patent
Jain et al.

(10) Patent No.: US 7,941,197 B2
(45) Date of Patent: May 10, 2011

(54) UPDATING MOBILE DEVICES WITH ADDITIONAL ELEMENTS

(75) Inventors: Deepak Jain, Garland, TX (US); Tuan Quoc Dao, Richardson, TX (US)

(73) Assignee: DeviceFidelity, Inc., Richardson, TX (US)

( * ) Notice: Subject to any disclaimer, the term of this patent is extended or adjusted under 35 U.S.C. 154(b) by 447 days.

(21) Appl. No.: 12/209,810

(22) Filed: Sep. 12, 2008

(65) Prior Publication Data
US 2009/0069050 A1 Mar. 12, 2009

Related U.S. Application Data

(60) Provisional application No. 60/971,813, filed on Sep. 12, 2007.

(51) Int. Cl.
*H04M 1/00* (2006.01)
(52) U.S. Cl. .................. 455/575.8; 379/433.05
(58) Field of Classification Search ........... 379/440, 379/433.05, 437, 438, 433.09; 455/575.8, 455/556.1, 558
See application file for complete search history.

(56) References Cited

U.S. PATENT DOCUMENTS

| | | |
|---|---|---|
| 3,713,148 A | 1/1973 | Cardullo et al. |
| 4,614,861 A | 9/1986 | Pavlov et al. |
| 4,766,293 A | 8/1988 | Boston |
| 4,797,542 A | 1/1989 | Hara |
| 4,876,441 A | 10/1989 | Hara et al. |
| 5,140,517 A | 8/1992 | Nagata et al. |
| 5,180,902 A | 1/1993 | Schick et al. |
| 5,272,319 A | 12/1993 | Rey |
| 5,276,311 A | 1/1994 | Hennige |
| 5,434,398 A | 7/1995 | Goldberg |
| 5,528,222 A | 6/1996 | Moskowitz et al. |
| 5,729,607 A | 3/1998 | DeFries et al. |
| 5,748,737 A | 5/1998 | Daggar |
| 5,768,370 A | 6/1998 | Maatta et al. |
| 5,834,747 A | 11/1998 | Cooper |
| 6,029,892 A | 2/2000 | Miyake |
| 6,032,859 A | 3/2000 | Muehlberger et al. |
| 6,041,305 A | 3/2000 | Sakurai |

(Continued)

FOREIGN PATENT DOCUMENTS

| | | |
|---|---|---|
| DE | 103 17 394 A1 | 11/2004 |
| DE | 20 2006 001 692 U1 | 4/2006 |
| EP | 1 111 557 A2 | 6/2001 |

(Continued)

OTHER PUBLICATIONS

Office Action issued in U.S. Appl. No. 12/209,087 on Nov. 4, 2009, 42 pages.

(Continued)

*Primary Examiner* — Tu X Nguyen
(74) *Attorney, Agent, or Firm* — Fish & Richardson P.C.

(57) ABSTRACT

The present disclosure is directed to a system and method for updating mobile devices with additional elements. In some implementations, a cover for a mobile device includes side surfaces, a rear surface, a physical interface, and a circuit. The side surfaces and the rear surface are configured to be adjacent at least a portion one or more side surfaces of the mobile phone. The side surfaces and the rear surface form an opening that receives at least a portion of the mobile device. A first portion of at least one of the surfaces includes a connector for connecting to a port of the mobile phone. The physical interface includes in at least one of the surfaces that receives a memory device external to the mobile device. The circuit connects the physical interface to the connector.

37 Claims, 16 Drawing Sheets

U.S. PATENT DOCUMENTS

| | | | |
|---|---|---|---|
| 6,073,840 A | 6/2000 | Marion | |
| 6,073,856 A | 6/2000 | Takahashi | |
| 6,078,806 A | 6/2000 | Heinonen et al. | |
| 6,308,890 B1 | 10/2001 | Cooper | |
| 6,347,218 B1 | 2/2002 | Fuhrmann et al. | |
| 6,418,326 B1 | 7/2002 | Heinonen et al. | |
| 6,764,005 B2 | 7/2004 | Cooper | |
| 6,771,981 B1 | 8/2004 | Zalewski et al. | |
| 6,853,987 B1 | 2/2005 | Cook | |
| 6,891,811 B1 | 5/2005 | Smith et al. | |
| 6,920,338 B2 | 7/2005 | Engstrom et al. | |
| 6,970,130 B1 | 11/2005 | Walters et al. | |
| 7,079,832 B2 | 7/2006 | Zalewski et al. | |
| 7,083,094 B2 | 8/2006 | Cooper | |
| 7,113,139 B2 | 9/2006 | Charrat | |
| 7,128,274 B2 | 10/2006 | Kelley et al. | |
| 7,133,659 B2 | 11/2006 | Zalewski et al. | |
| 7,147,165 B2 | 12/2006 | Mongin et al. | |
| 7,155,199 B2 | 12/2006 | Zalewski et al. | |
| 7,183,505 B2 | 2/2007 | Mongin et al. | |
| 7,228,155 B2 | 6/2007 | Saunders | |
| 7,286,818 B2 | 10/2007 | Roseberg | 455/414.1 |
| 7,290,716 B2 | 11/2007 | Ito | |
| 7,334,732 B2 | 2/2008 | Cooper | |
| 7,343,184 B2 * | 3/2008 | Rostami | 455/575.8 |
| 7,364,092 B2 | 4/2008 | Narendra et al. | |
| 7,395,975 B2 | 7/2008 | Ito | |
| 7,407,094 B2 | 8/2008 | Myers et al. | |
| 7,494,068 B2 | 2/2009 | Patrice | |
| 7,509,487 B2 | 3/2009 | Lu et al. | |
| 7,530,495 B2 | 5/2009 | Cooper | |
| 7,537,169 B2 | 5/2009 | Gonzalez et al. | |
| 7,575,177 B2 | 8/2009 | Killian et al. | |
| 7,581,678 B2 | 9/2009 | Narendra et al. | |
| 7,588,184 B2 | 9/2009 | Gandel et al. | |
| 7,599,857 B2 | 10/2009 | Bishop et al. | |
| 7,601,031 B2 | 10/2009 | Tanaka et al. | |
| 7,604,176 B2 | 10/2009 | Bates et al. | |
| 7,606,560 B2 | 10/2009 | Labrou et al. | |
| 7,657,255 B2 | 2/2010 | Abel et al. | |
| 7,707,113 B1 | 4/2010 | DiMartino et al. | |
| 7,748,031 B2 | 6/2010 | Gonzalez et al. | |
| 7,774,231 B2 | 8/2010 | Pond et al. | |
| 7,789,313 B2 | 9/2010 | Degauque et al. | |
| 7,805,615 B2 | 9/2010 | Narendra et al. | |
| 7,821,399 B2 | 10/2010 | Otranen | |
| 2001/0006902 A1 | 7/2001 | Ito | |
| 2001/0054087 A1 | 12/2001 | Flom et al. | |
| 2002/0023215 A1 | 2/2002 | Wang et al. | |
| 2002/0055368 A1 | 5/2002 | Lee | |
| 2002/0065902 A1 | 5/2002 | Janik et al. | |
| 2003/0064689 A1 | 4/2003 | Engstrom et al. | |
| 2003/0135463 A1 | 7/2003 | Brown et al. | |
| 2003/0204845 A1 | 10/2003 | Sibley et al. | |
| 2004/0064612 A1 | 4/2004 | Pinto et al. | |
| 2004/0073519 A1 | 4/2004 | Fast | |
| 2004/0127256 A1 | 7/2004 | Goldthwaite et al. | |
| 2004/0209648 A1 | 10/2004 | Chen | |
| 2004/0220964 A1 | 11/2004 | Shiftan et al. | |
| 2004/0256469 A1 | 12/2004 | Faenza et al. | |
| 2005/0022002 A1 | 1/2005 | Poisner | |
| 2005/0023359 A1 | 2/2005 | Saunders | |
| 2005/0027543 A1 | 2/2005 | Labrou et al. | |
| 2005/0055549 A1 | 3/2005 | Fischer | |
| 2005/0182710 A1 | 8/2005 | Andersson et al. | |
| 2005/0182926 A1 | 8/2005 | Akashika et al. | |
| 2005/0212690 A1 | 9/2005 | Nishikawa | |
| 2005/0224589 A1 | 10/2005 | Park et al. | |
| 2005/0269401 A1 | 12/2005 | Spitzer et al. | |
| 2005/0269402 A1 | 12/2005 | Spitzer et al. | |
| 2006/0074698 A1 | 4/2006 | Bishop et al. | |
| 2006/0186209 A1 | 8/2006 | Narendra et al. | |
| 2006/0219776 A1 | 10/2006 | Finn | |
| 2006/0226217 A1 | 10/2006 | Narendra et al. | |
| 2006/0287004 A1 | 12/2006 | Fuqua | |
| 2006/0287964 A1 | 12/2006 | Brown | |
| 2006/0291483 A1 | 12/2006 | Sela | |
| 2007/0011724 A1 | 1/2007 | Gonzalez et al. | |
| 2007/0014407 A1 | 1/2007 | Narendra et al. | |
| 2007/0014408 A1 | 1/2007 | Narendra et al. | |
| 2007/0016798 A1 | 1/2007 | Narendra et al. | |
| 2007/0023532 A1 | 2/2007 | Narendra et al. | |
| 2007/0053306 A1 | 3/2007 | Stevens | |
| 2007/0099592 A1 | 5/2007 | Thome et al. | |
| 2007/0113260 A1 | 5/2007 | Pua et al. | |
| 2007/0145135 A1 | 6/2007 | Jogand-Coulomb et al. | |
| 2007/0145152 A1 | 6/2007 | Jogand-Coulomb et al. | |
| 2007/0152035 A1 | 7/2007 | Adams et al. | |
| 2007/0155430 A1 | 7/2007 | Cheon et al. | 455/558 |
| 2007/0156436 A1 | 7/2007 | Fisher et al. | |
| 2007/0156933 A1 | 7/2007 | Pinto et al. | |
| 2007/0170256 A1 | 7/2007 | Breitfuss | |
| 2007/0194105 A1 | 8/2007 | Kissick | |
| 2007/0253251 A1 | 11/2007 | Mizushima et al. | |
| 2007/0254712 A1 | 11/2007 | Chitti | |
| 2008/0003882 A1 | 1/2008 | Ni et al. | |
| 2008/0051059 A1 | 2/2008 | Fisher | 455/410 |
| 2008/0051122 A1 | 2/2008 | Fisher | |
| 2008/0052192 A1 | 2/2008 | Fisher | |
| 2008/0052233 A1 | 2/2008 | Fisher et al. | |
| 2008/0090527 A1 | 4/2008 | Atkinson et al. | |
| 2008/0093467 A1 | 4/2008 | Narendra et al. | |
| 2008/0144650 A1 | 6/2008 | Boch et al. | |
| 2008/0244208 A1 | 10/2008 | Narendra et al. | |
| 2008/0263680 A1 | 10/2008 | Bertin | |
| 2008/0277484 A1 | 11/2008 | Launay et al. | |
| 2008/0279381 A1 | 11/2008 | Narendra et al. | |
| 2008/0290160 A1 | 11/2008 | Huot et al. | |
| 2009/0002167 A1 | 1/2009 | Mosteller | |
| 2009/0006722 A1 | 1/2009 | McAvoy et al. | |
| 2009/0024533 A1 | 1/2009 | Fernandes et al. | |
| 2009/0040116 A1 | 2/2009 | Eray | |
| 2009/0064045 A1 * | 3/2009 | Tremblay | 715/835 |
| 2009/0068982 A1 | 3/2009 | Chen et al. | |
| 2009/0103732 A1 | 4/2009 | Benteo et al. | |
| 2009/0108063 A1 | 4/2009 | Jain et al. | |
| 2009/0115571 A1 | 5/2009 | Bishop et al. | |
| 2009/0127345 A1 | 5/2009 | Chamley et al. | |
| 2009/0137152 A1 | 5/2009 | Tanaka et al. | |
| 2009/0137204 A1 | 5/2009 | Chang | |
| 2009/0143104 A1 | 6/2009 | Loh et al. | |
| 2009/0152361 A1 | 6/2009 | Narendra et al. | |
| 2009/0169013 A1 | 7/2009 | Fascenda et al. | |
| 2009/0177530 A1 | 7/2009 | King et al. | |
| 2009/0192935 A1 | 7/2009 | Griffin et al. | |
| 2009/0193500 A1 | 7/2009 | Griffin et al. | |
| 2009/0210569 A1 | 8/2009 | Lusetti et al. | |
| 2009/0216681 A1 | 8/2009 | McCown | |
| 2009/0224888 A1 | 9/2009 | Caruana | |
| 2009/0234760 A1 | 9/2009 | Walter | |
| 2009/0235037 A1 | 9/2009 | Mounier et al. | |
| 2009/0298540 A1 | 12/2009 | Narendra et al. | |
| 2010/0022273 A1 | 1/2010 | Patrice | |
| 2010/0107230 A1 | 4/2010 | Tyagi et al. | |
| 2010/0136913 A1 | 6/2010 | Picquenot et al. | |
| 2010/0203870 A1 | 8/2010 | Hubinak et al. | |
| 2010/0205373 A1 | 8/2010 | He et al. | |
| 2010/0213265 A1 | 8/2010 | Narendra et al. | |
| 2010/0258639 A1 | 10/2010 | Florek et al. | |
| 2010/0262840 A1 | 10/2010 | Benteo et al. | |
| 2010/0274712 A1 | 10/2010 | Mestre et al. | |

FOREIGN PATENT DOCUMENTS

| | | |
|---|---|---|
| EP | 1 306 760 A1 | 5/2003 |
| EP | 1 626 349 A1 | 2/2006 |
| EP | 1 770 601 A1 | 4/2007 |
| EP | 1 773 059 A1 | 4/2007 |
| EP | 1 933 259 A1 | 6/2008 |
| JP | 4083447 | 3/1992 |
| WO | WO 91/12698 | 8/1991 |
| WO | WO 99/34314 A1 | 7/1999 |
| WO | WO 00/28490 A1 | 5/2000 |
| WO | WO 01/22695 A1 | 3/2001 |
| WO | WO 01/48688 A1 | 7/2001 |
| WO | WO 02/11074 | 2/2002 |
| WO | WO 2005/119607 A1 | 12/2005 |
| WO | WO 2005/119608 A1 | 12/2005 |

| | | |
|---|---|---|
| WO | WO 2006/086232 A2 | 8/2006 |
| WO | WO 2006/091709 A2 | 8/2006 |
| WO | WO 2006/108184 A1 | 10/2006 |
| WO | WO 2007/011937 A2 | 1/2007 |
| WO | WO 2007/011990 A2 | 1/2007 |
| WO | WO 2007/011991 A2 | 1/2007 |
| WO | WO 2007/011992 A1 | 1/2007 |
| WO | WO 2007/052151 | 5/2007 |
| WO | WO 2007/088898 A1 | 8/2007 |
| WO | WO 2007/125223 A2 | 11/2007 |

OTHER PUBLICATIONS

Rankl, W., and Effing, W., *Smart Card Handbook*, Second Edition, John Wiley & Sons, Ltd., Sep. 18, 2000, 32 pages.
International Search Report and Written Opinion of the International Searching Authority issued in international Application No. PCT/US2008/076046, filed Sep. 11, 2008, mailed Jan. 8, 2010, 14 pages.
International Preliminary Report on Patentability issued in international Application No. PCT/US2008/075977, filed Sep. 11, 2008, mailed Dec. 30, 2009, 6 pages.
International Preliminary Report on Patentability issued in international Application No. PCT/US2008/076006, filed Sep. 11, 2008, mailed Dec. 29, 2009, 11 pages.
International Preliminary Report on Patentability issued in international Application No. PCT/US2008/076033, filed Sep. 11, 2008, mailed Dec. 29, 2009, 7 pages.
International Preliminary Report on Patentability issued in international Application No. PCT/US2008/076275, filed Sep. 12, 2008, mailed Dec. 10, 2009, 14 pages.
International Preliminary Report on Patentability issued in international Application No. PCT/US2008/076318, filed Sep. 12, 2008, mailed Sep. 11, 2009, 12 pages.
International Preliminary Report on Patentability issued in international Application No. PCT/US2008/076158, filed Sep. 12, 2008, mailed Dec. 29, 2009, 13 pages.
International Preliminary Report on Patentability issued in international Application No. PCT/US2008/076316, filed Sep. 12, 2008, mailed Nov. 27, 2009, 19 pages.
International Preliminary Report on Patentability issued in international Application No. PCT/US2008/076319, filed Sep. 12, 2008, mailed Dec. 16, 2009, 12 pages.
Notification of Transmittal of the International Search Report and the Written Opinion of the International Searching Authority for appl. No. PCT/US2008/075977 filed Sep. 11, 2008, mailed Dec. 29, 2008 (12 pages).
Notification of Transmittal of the International Search Report and the Written Opinion of the International Searching Authority for appl. No. PCT/US2008/076006 filed Sep. 11, 2008, mailed Dec. 16, 2008 (13 pages).
Notification of Transmittal of the International Search Report and the Written Opinion of the International Searching Authority for appl. No. PCT/US2008/076033 filed Sep. 11, 2008, mailed Jan. 5, 2009 (12 pages).
Notification of Transmittal of the International Search Report and the Written Opinion of the International Searching Authority for appl. No. PCT/US2008/076318 filed Sep. 12, 2008, mailed Feb. 2, 2009 (14 pages).
Notification of Transmittal of the International Search Report and the Written Opinion of the International Searching Authority for appl. No. PCT/US2008/076158 filed Sep. 12, 2008, mailed Dec. 11, 2008 (14 pages).
Notification of Transmittal of the International Search Report and the Written Opinion of the International Searching Authority for appl. No. PCT/US2008/076316 filed Sep. 12, 2008, mailed Jan. 13, 2009 (14 pages).
Notification of Transmittal of the International Search Report and the Written Opinion of the International Searching Authority for appl. No. PCT/US2008/076319 filed Sep. 12, 2008, mailed Jan. 14, 2009 (15 pages).
Uren P: "*Internet Smartcard Benefits for Internet Security Issues*" Campus-Wide Information Systems, Emerald Group Publishing Ltd., Bradford, GB, vol. 20, No. 3, Jan. 1, 2003, pp. 105-114 (XP008078638).

U.S. Appl. No. 12/205,796, titled Wirelessly Executing Financial Transactions, inventor Jain, filed Sep. 5, 2009.
U.S. Appl. No. 12/205,807, titled Interfacign Transaction Cards With Host Devices, inventor Jain, filed Sep. 5, 2008.
U.S. Appl. No. 12/205,814, titled Presenting Web Pages Through Mobile Host Devices, inventor Jain, filed Sep. 5, 2009.
U.S. Appl. No. 12/205,821, titled Selectively Switching Antennas of Transaction Cards, inventor Jain, filed Sep. 5, 2008.
U.S. Appl. No. 12/206,564, titled Wirelessly Executing Transactions With Different Enterprises, inventor Jain, filed Sep. 8, 2008.
U.S. Appl. No. 12/209,950, titled Wirelessly Accessing Broadband Services Using Intelligent Cards, inventor Jain, filed Sep. 12, 2008.
U.S. Appl. No. 12/210,167, titled Wirelessly Receiving Broadcast Signals Using Intelligent Cards, inventor Jain, filed Sep. 12, 2008.
U.S. Appl. No. 12/209,087, titled Wirelessly Executing Financial Transactions, inventor Jain, filed Sep. 11, 2008.
U.S. Appl. No. 12/210,161, titled Wirelessly Accessing Broadband Services Using Intelligent Covers, inventors Jain, et al., filed Sep. 12, 2008.
U.S. Appl. No. 12/210,176, titled Receiving Broadcast Signals Using Intelligent Covers for Mobile Devices, inventors Jain, et al., filed Sep. 12, 2008.
U.S. Appl. No. 12/272,527, titled Wirelessly Communicating Radio Frequency Signals, inventors Jain, et al., filed Nov. 17, 2008.
U.S. Appl. No. 12/568,592, titled Switching Between Internal and External Antennas, inventor Jain, filed Sep. 28, 2008.
U.S. Appl. No. 12/571,163, titled Amplifying Radio Frequency Signals, inventor Jain, filed Sep. 30, 2008.
International Preliminary Report on Patentability issued in International Application No. PCT/US2008/076318, filed Sep. 12, 2008, mailed Sep. 11, 2009, 12 pages.
International Search Report and Written Opinion issued in International Application No. PCT/US2008/076307 on May 26, 2009, 15 pages.
International Preliminary Report on Patentability issued in International Application No. PCT/US2008/076046 on May 21, 2010; 13 pages.
U.S. Appl. No. 12/678,052 entitled "Updating Mobile Devices with Additional Elements", inventors Jain et al., filed Mar. 12, 2010.
Office Action issued in U.S. Appl. No. 12/209,087 on Jul. 7, 2010; 36 pages.
U.S. Appl. No. 12/678,047 entitled "Wirelessly Accessing Broadband Services Using Intelligent Covers", inventors Jain et al., filed Mar. 12, 2010.
U.S. Appl. No. 12/678,085 entitled "Receiving Broadcast Signals Using Intelligent Covers for Mobile Devices", inventors Jain et al., filed Mar. 12, 2010.
U.S. Appl. No. 60/222,475 entitled "Electronic Device Cover With Embedded Radio Frequency (RF) Transponder and Methods of Using Same", inventor Zalewski, filed Aug. 2, 2000; 46 pages.
Office Action issued in U.S. Appl. No. 12/205,821 on Oct. 13, 2010; 15 pages.
Office Action issued in U.S. Appl. No. 12/206,564 on Nov. 23, 2010; 15 pages.
Communication Pursuant to Article 94(3) EPC issued in European Application No. 08830698.0 on Nov. 29, 2010; 5 pages.
Communication Pursuant to Article 94(3) EPC issued in European Application No. 08830136.1 on Nov. 29, 2010; 3 pages.
U.S. Appl. No. 12/776,285 entitled "Magnetically Coupling Radio Frequency Antennas", inventor Jain, filed May 7, 2010.
International Search Report and the Written Opinion of the International Searching Authority issued in International Application No. PCT/US2009/061018 Mar. 1, 2010, 14 pages.
International Search Report and the Written Opinion of the International Searching Authority issued in International Application No. PCT/US2009/061032, Mar. 3, 2010, 14 pages.
International Preliminary Report on Patentability issued in International Application No. PCT/US2008/076046, Mar. 16, 2010, 8 pages.
Notification of Transmittal of the International Search Report and the Written Opinion of the International Searching Authority, or the Declaration issued in PCT/US2008/076275 on Apr. 16, 2009, 15 pages.

* cited by examiner

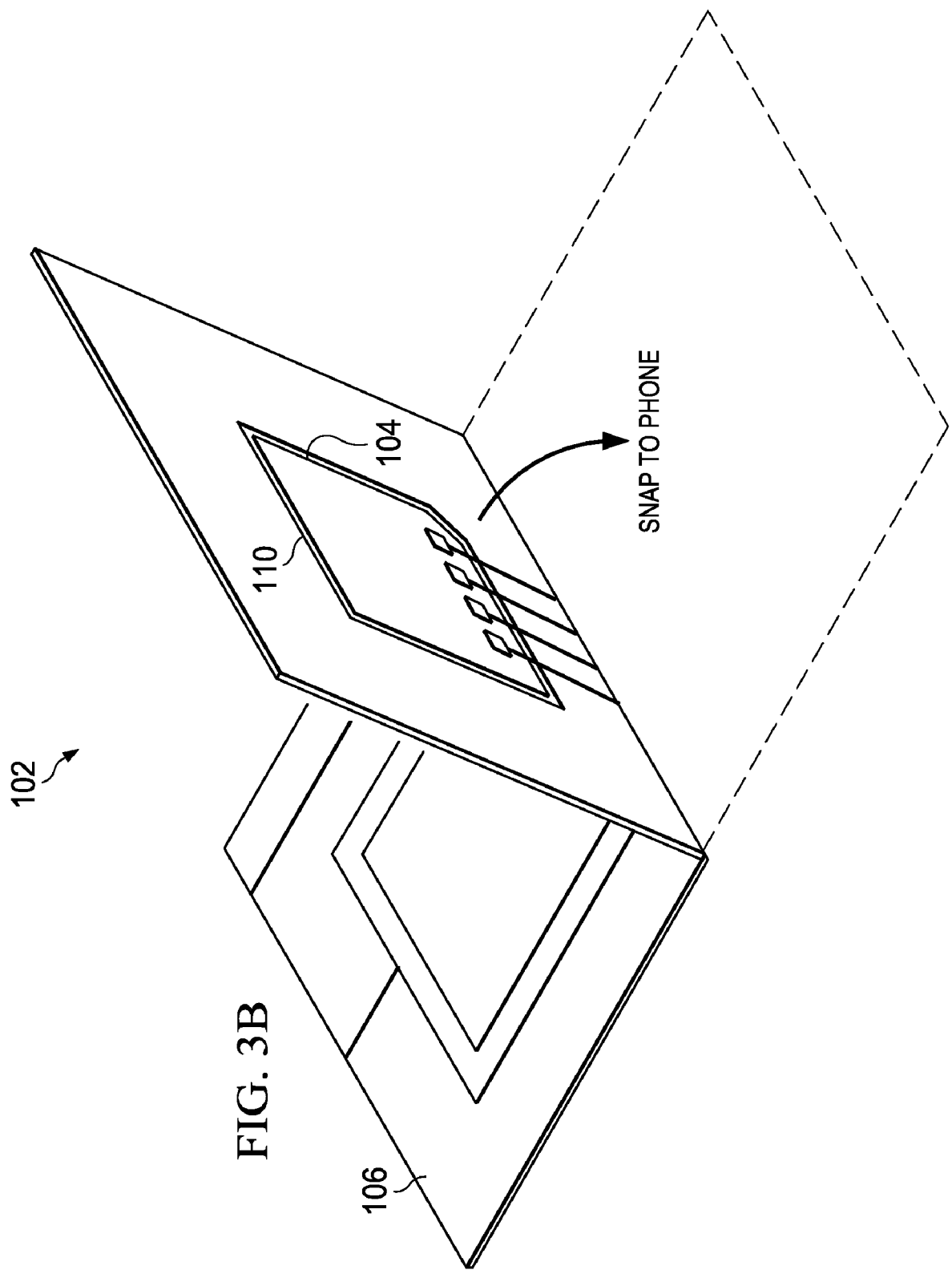

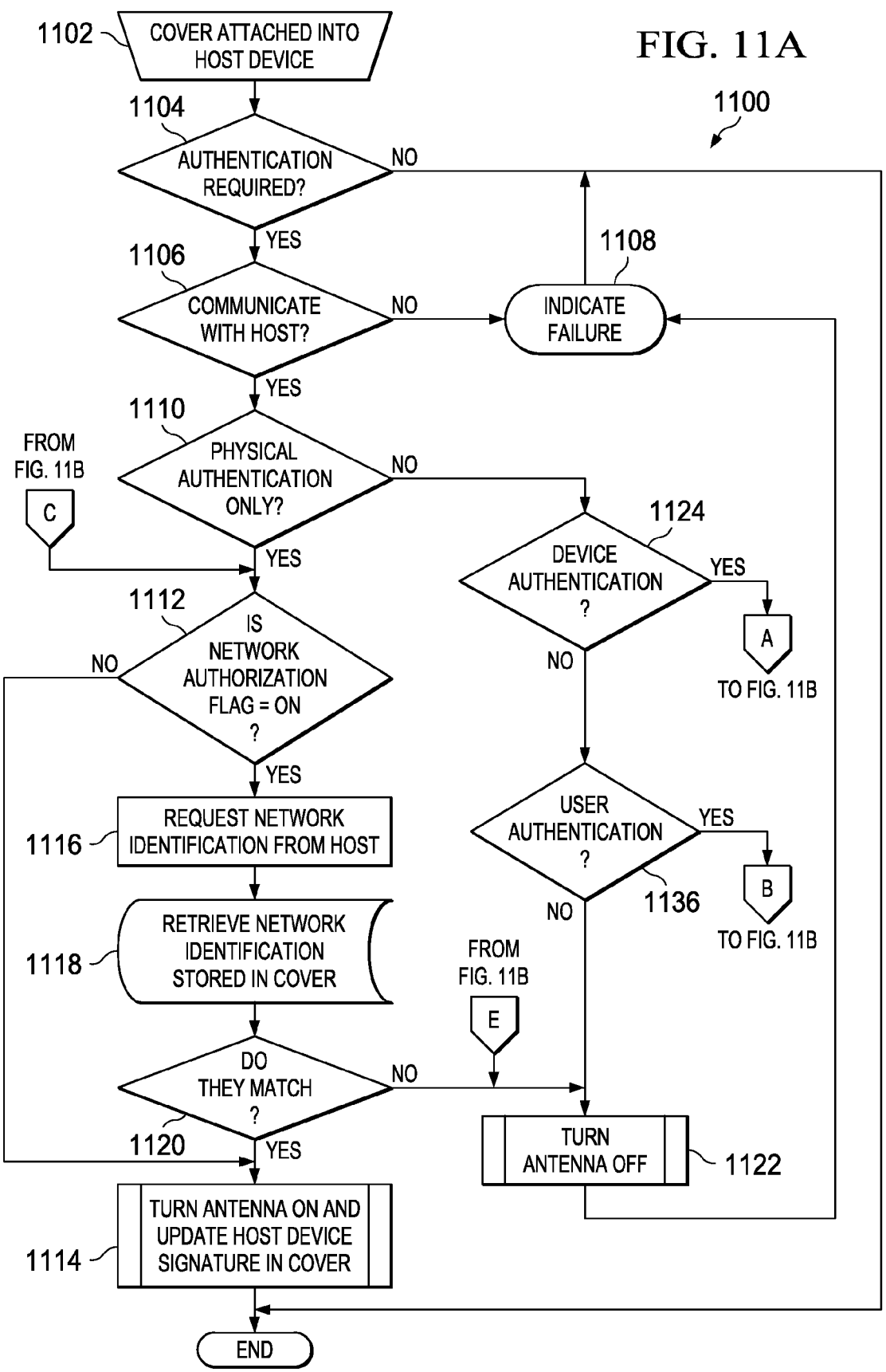

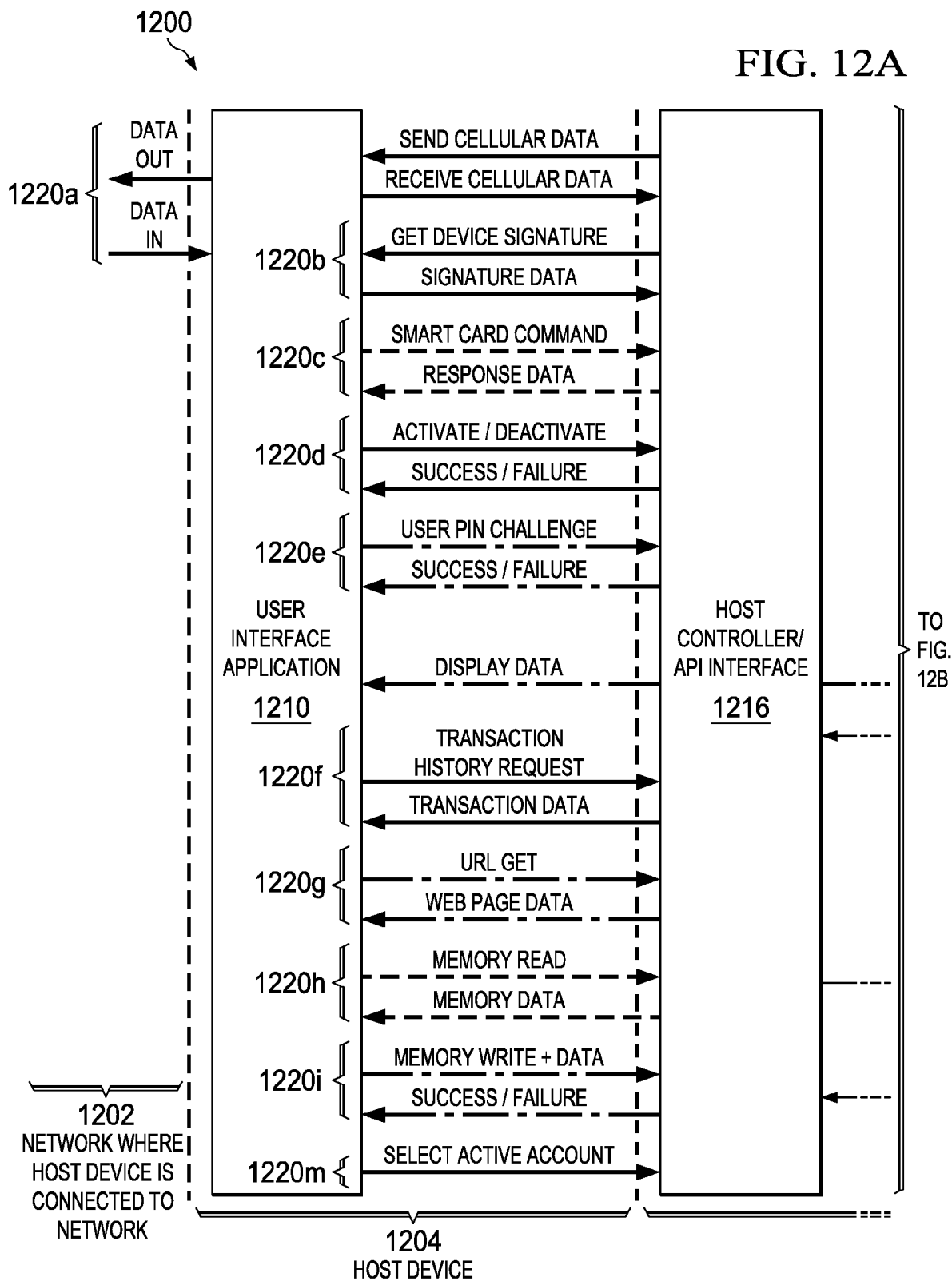

UPDATING MOBILE DEVICES WITH ADDITIONAL ELEMENTS

CLAIM OF PRIORITY

This application claims priority under 35 USC §119(e) to U.S. Patent Application Ser. No. 60/971,813, filed on Sep. 12, 2007, the entire contents of which are hereby incorporated by reference.

TECHNICAL FIELD

This invention relates to mobile devices and, more particularly, to updating mobile devices with additional elements.

BACKGROUND

Portable electronic devices and tokens have become an integrated part of the regular day to day user experience. There is a wide variety of common portable and handheld devices that users have in their possession including communication, business and entertaining devices such as cell phones, music players, digital cameras, smart cards, memory token and variety of possible combinations of the aforementioned devices and tokens. All of these devices share the commonality that consumer are accustomed to carrying them with them most of the time and to most places. This is true across the various demographics and age groups regardless of the level of the sophistication of the consumer, their age group, their technical level or background.

These common handheld devices offer options for expandable memory. Micro Secure Digital (microSD) is the popular interface across high-end cellphones while SD and MultiMediaCard (MMC) interfaces are also available in limited models. MicroSD is the least common denominator supported by the majority of these devices and tokens (in terms of size). In addition, adaptors are available to convert a MicroSD into MiniSD, SD, MMC and USB Although most popular MP3 player (iPOD) offer's a proprietary interface, competing designs do offer standard interfaces. Digital cameras offer mostly SD and MMC while extreme Digital (xD) is another option. Micro and Mini versions of these interfaces are also available in several models. Mini-USB is increasingly available across cellphones, digital cameras and MP3 players for synchronization with laptops.

SUMMARY

The present disclosure is directed to a system and method for updating mobile devices with additional elements. In some implementations, a cover for a mobile device includes side surfaces, a rear surface, a physical interface, and a circuit. The side surfaces and the rear surface are configured to be adjacent at least a portion one or more side surfaces of the mobile phone. The side surfaces and the rear surface form an opening that receives at least a portion of the mobile device. A first portion of at least one of the surfaces includes a connector for connecting to a port of the mobile phone. The physical interface includes in at least one of the surfaces that receives a memory device external to the mobile device. The circuit connects the physical interface to the connector.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 3A and 3B illustrate example slots in the cover of FIG. 1;

Like reference symbols in the various drawings indicate like elements.

DETAILED DESCRIPTION

Figure 1:
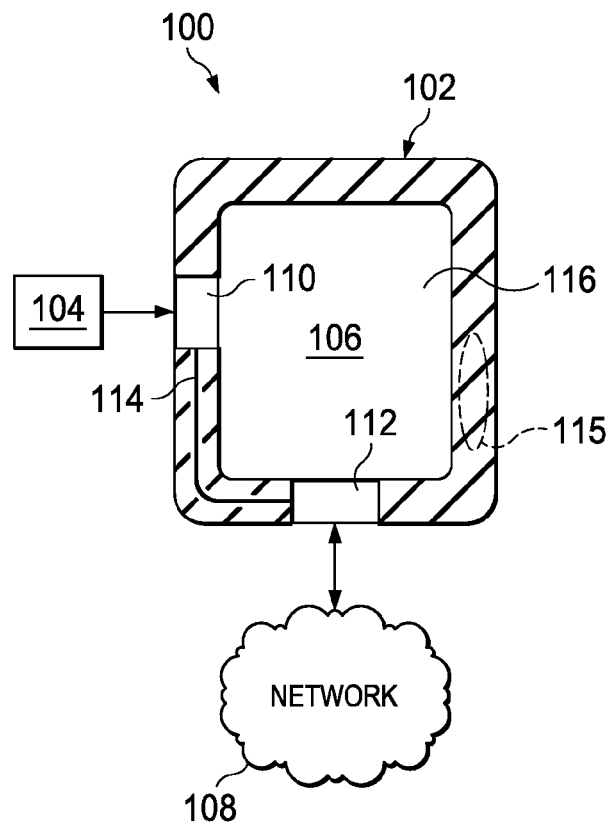
FIG. 1 is an example updating system in accordance with some implementations of the present disclosure.

FIG. 1 is a block diagram illustrating an example system 100 for augmenting a mobile device, for example an iPhone, with additional external devices using a cover for the mobile device. For example, the system 100 may add an external micoSecureDigital (microSD) slot to a mobile host device, for example an iPhone, using a flexible cover that encloses at least a portion of the mobile device and connects to a port of the mobile device. Aside from microSD, the system 100 may add an external memory device to a mobile device using other interfaces such as, for example, MultiMediaCard (MMC), SD, miniSD, Firewire, and/or others. By adding external devices (e.g., memory, transaction cards), the system 100 may upgrade a mobile device that does not include expansion slots with additional external devices while substantially maintaining the dimensions of the device. For example, the cover may increase the dimensions of the by 5 percent or less. In other words, the cover may add a device slots to a mobile device while substantially maintaining original attributes such as speaker outputs, network signal strength, headphone jacks, battery charging, docking ports, and others. In some implementations, the system 100 may update mobile devices with external memory devices, transaction cards, and/or other devices. For example, the intelligent card may wirelessly execute transactions with different enterprises using a single intelligent card and independent of a mobile host device. In other words, a single intelligent card included with the cover may execute a payment transaction with a financial institution, an access control transaction with a enterprise network, a ticket purchase transaction with a transit authority and/or an identity validation transaction with a government agency. In such implementations, each of the transactions can securely identify a user and user privileges with respect to the services being received from the different enterprises. In doing so, the cover including the intelligent card may operate as a logical wallet. In some of these implementations, the cover may include a circuit that converts signals between a form compatible with an external memory device (e.g., microSD) and a form compatible with the mobile device (e.g., USB). In addition, the system 100 may include an intelligent card integrated into an the cover such that removable may at least partially damage the cover.

At a high level, the system 100 includes a cover 102, an external device 104, a mobile device 106 and a network 108. The cover 102 including a slot 110 for connecting to the external device 104, a connector 112 for connecting to the mobile device 106, and a circuit 114 for communicably connecting the slot 110, an antenna 115 for boosting transmission and reception of RF signals, and the connector 112. The cover 102 may update the mobile device 106 with an external device 104. In addition, the cover 102 encloses at least a portion of the mobile device 106. In the case of enclosing a portion of the mobile device 106, the cover 102 may include other aspects that expose ports of the mobile device 106 for connecting with external peripherals such that the cover 102 does not substantially interfere with such connections. In other words, the cover 102 may either include ports substantially aligned with ports of the mobile device 106 or provide openings that allow substantially unrestricted access to the original ports of the device 106 (see FIG. 2C). The mobile device 106 may be communicable coupled to the network 108. The mobile device 106 includes a Graphical User Interface (GUI) 116 for presenting information to and/or receiving information from users.

The cover 102 can include any software, hardware, and/or firmware configured to update the mobile device 106 with one or more external devices slots. For example, the cover 102 may include a microSD slot and a physical interface for connecting to a port of the mobile device. In this example, the cover 102 may connect the microSD slot to the mobile device 106 using the physical interface. In some implementations, the cover 102 may include one or more of the following: one or more slots for external devices (e.g., memory, wireless transaction cards); one or more connectors that connect to the mobile device 106; one or more circuits for connecting the one or more slots to the one or more connectors; a conversion module that converts signals between different formats; a biometric reader that determines biometric information of a user of the mobile device 106; and/or other elements. In some implementations, the cover 102 may be formed of a flexible material such as, for example, silicone rubber, a soft neoprene, and/or other material. The opening formed by the cover 102 may be substantially be the same as or less than the dimensions of the mobile device 106. In the case of the opening dimensions being less, the cover 102 may be slightly flexible to stretch over the mobile device 106. The cover 102 may substantially maintain attributes of the mobile device 106, such as dimensions, accessibility to peripherals as provided by the device, charging, battery life, signal strength, access to display and all other input devices, connectivity to the wireless network if any, interface capability to a PC if any and any other features provided by the device. In maintaining the attributes, the added functionality may not degrade the device performance in any manner such that certification by regulatory authorities (e.g., FCC) and warranty by the issuer of the device 106 is compromised.

In the illustrated implementation, the cover 102 includes the slot 110, the connector 112 and the circuit 114. The slot 110 may comprise an MMC, miniMMC, microMMC, SD, miniSD, microSD, and/or other slots. The slot 110 may including an opening such that the external device 104 may be inserted after the mobile device 106 is inserted into the cover 102. In some implementations, the slot 110 may be formed in the rear surface such that cover 102 is removed or at least portion moved away from the surface of the mobile device 106 to insert the external device 104. In some implementations, the slot 110 and the external device 104 are integrated into the cover 102, and in this case, the external device 104 may not be removable without damaging the cover 102. The connector 112 includes at least a portion that connects to a port of the mobile device 106. The connector 112 may include a USB, iDock, microUSB, Firewire, Serial, and/or other connectors offered by the mobile device 106. In some implementations, the connector 112 may include a first interface for connecting to the mobile device 106 and a second interface for connecting with external devices. The second interface may be substantially similar in dimensions and interface capabilities as the original connector of the mobile device 106. In these instances, the connector 112 may pass one or more signals from external devices to the mobile device 106 without, for example, interfering with the connecting to the external device 104. For example, the connector 112 may include a second interface that connects with the power supply of the mobile device 106 and passes the signal to the mobile device 106 for charging. The circuit 114 can include any software, hardware, and firmware for communicably connecting the slot 110 with the connector 112. For example, the circuit 114 may include one or more wired connections between the slot 110 and the connector 112. In addition, the circuit 114 may also include a booster antenna that may enhance the signal reception capability of the mobile device 106 and/or the signal reception capability of any wireless transaction cards inserted into the slot 110 (see FIG. 2A). In some implementations, the circuit 114 may execute one or more of the following: pass signals between the slot 110 and the connector 112; translated or otherwise convert signals between forms compatible with the external device 104 and forms compatible with the mobile device 106; detect biometric information of a user of the mobile device 106; manage access to the external device 104 based, at least in part, on detected biometric information; enhance signal reception of the host device via an integrated booster antenna; enhance signal reception of a wireless transaction card inserted into the slot; provide access to software and system on the device inserted into the slot for an application residing on the mobile device; and/or other processes.

The external device 104 can include any software, hardware, and/or firmware configured to update the mobile device 106 with one or more features and/or functions. For example, the external device 104 may include solid-state memory (e.g., flash, EEPROM) for storing information received, for example, from the mobile device 106. The external device 104 may update the mobile device 106 with, for example, external memory, a wireless transaction card, a broadcast receiver, a broadband transceiver, and/or other elements. In regards to memory, the external device 104 may be a Flash or memory package, which is non-volatile memory that may be electrically erased and reprogrammed. The external device 104 may be a memory card, USB Flash drives, and/or other memory device. For example, the external device 104 may include Electrically Erasable Programmable Read-Only Memory (EEPROM) that is erased and programmed in blocks. In regards to memory cards, the external device 104 may be MMC, microMMC, miniMMC, SD, microSD, miniSD, Memory Stick, Memory Stick Duo, xD-Picture Card, Secure Digital High Capacity (SDHC), and/or other memory card. In some implementations, the external device 104 may include a memory capacity between 1 MB and 1 TB. Alternatively or in addition, the external device 104 may be a transaction card as discussed with respect to FIGS. 5 to 14. In these implementations, the external card 104 may wirelessly execute transactions with, for example, a point of sale device. In some implementations, the external card 104 is integrated/embedded into the cover 102. The external card 104 may store user credentials for a credit card, a debit card, a prepaid card, a gift card, a checking account, and/or other user accounts. In addition, the intelligent card may also store user credentials for other applications such as loyalty (points for purchase), airline (access to clubs, check-in), state (driving license), memberships (clubs) and/or others where user credentials are used to identify user so that goods and/or services can be provided. By storing multiple user credentials in a single external card 104, the system 100 may execute transactions with different institutions without requiring multiple instruments, as discussed in more detail with respect to FIGS. 5-14.

The mobile device 106 comprises an electronic device operable to interface with the cover 102 using one or more ports. For example, the mobile device 106 may have an iDock port that connects with the cover 102. As used in this disclosure, the mobile device 106 is intended to encompass cellular phones (e.g., iPhone), data phones, pagers, portable computers, SIP phones, smart phones, personal data assistants (PDAs), digital cameras, MP3 players, camcorders, one or more processors within these or other devices, or any other suitable processing devices capable of communicating information with the cover 102 through one or more ports and may not have otherwise have a slot for external card 104 could be directly plugged in. The one or more ports may include, for example, a USB port, an iDock port, a FireWire port, a serial port and/or any other interface port provided by the mobile device for connectivity with peripherals, and/or other ports. In some implementations, the mobile devices 106 may be based on cellular radio technology. For example, the mobile device 106 may be a PDA operable to wirelessly connect with an external or unsecured network. In another example, the mobile device 106 may comprise a digital multimedia player that includes an input device, such as a keypad, a jog wheel, a jog dial, touch screen, or other device that can accept information or allows selection of user interface elements, and an output device that conveys information associated with the system 100, including digital data, visual information, or GUI 116.

The GUI 116 comprises a graphical user interface operable to allow the user of the mobile device 106 to interface with at least a portion of the system 100 for any suitable purpose, such as executing transactions and/or and presenting transaction history. Generally, the GUI 116 provides the particular user with an efficient and user-friendly presentation of data provided by or communicated within the system 100 and/or also an efficient and user-friendly means for the user to self-manage settings and access services offered by an institution. The GUI 116 may comprise a plurality of customizable frames or views having interactive fields, pull-down lists, and/or buttons operated by the user. The term graphical user interface may be used in the singular or in the plural to describe one or more graphical user interfaces and each of the displays of a particular graphical user interface. The GUI 116 can include any graphical user interface, such as a generic web browser or touch screen, that processes information in the system 100 and presents the results to the user.

Network 108 facilitates wireless or wired communication between institutions and any other local or remote computer, such as the mobile device 106. Network 108 may be all or a portion of an enterprise or secured network. While illustrated as single network, network 108 may be a continuous network logically divided into various sub-nets or virtual networks without departing from the scope of this disclosure, so long as at least a portion of network 108 may facilitate communications with the mobile device 106. In some implementations, network 108 encompasses any internal or external network, networks, sub-network, or combination thereof operable to facilitate communications between various computing components in system 100. Network 108 may communicate, for example, Internet Protocol (IP) packets, Frame Relay frames, Asynchronous Transfer Mode (ATM) cells, voice, video, data, and other suitable information between network addresses. Network 108 may include one or more local area networks (LANs), radio access networks (RANs), metropolitan area networks (MANs), wide area networks (WANs), all or a portion of the global computer network known as the Internet, and/or any other communication system or systems at one or more locations.

Figure 2A:
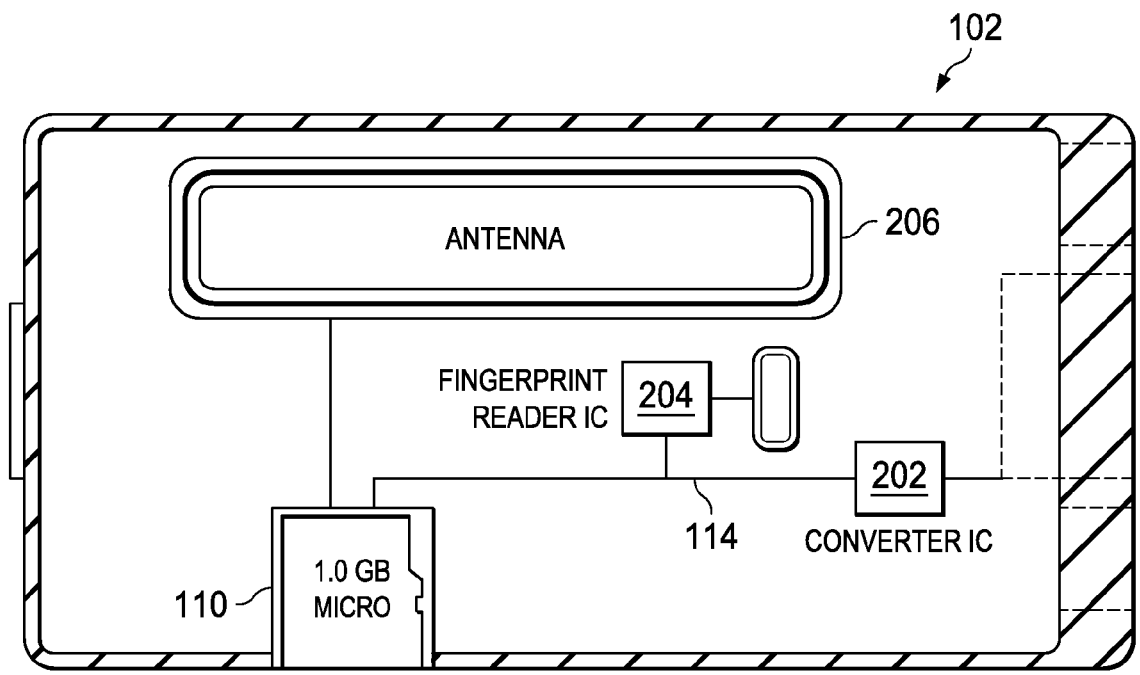
FIGS. 2A to 2C illustrate cross sectional views of some implementations of the cover of FIG. 1.
Figure 2B:
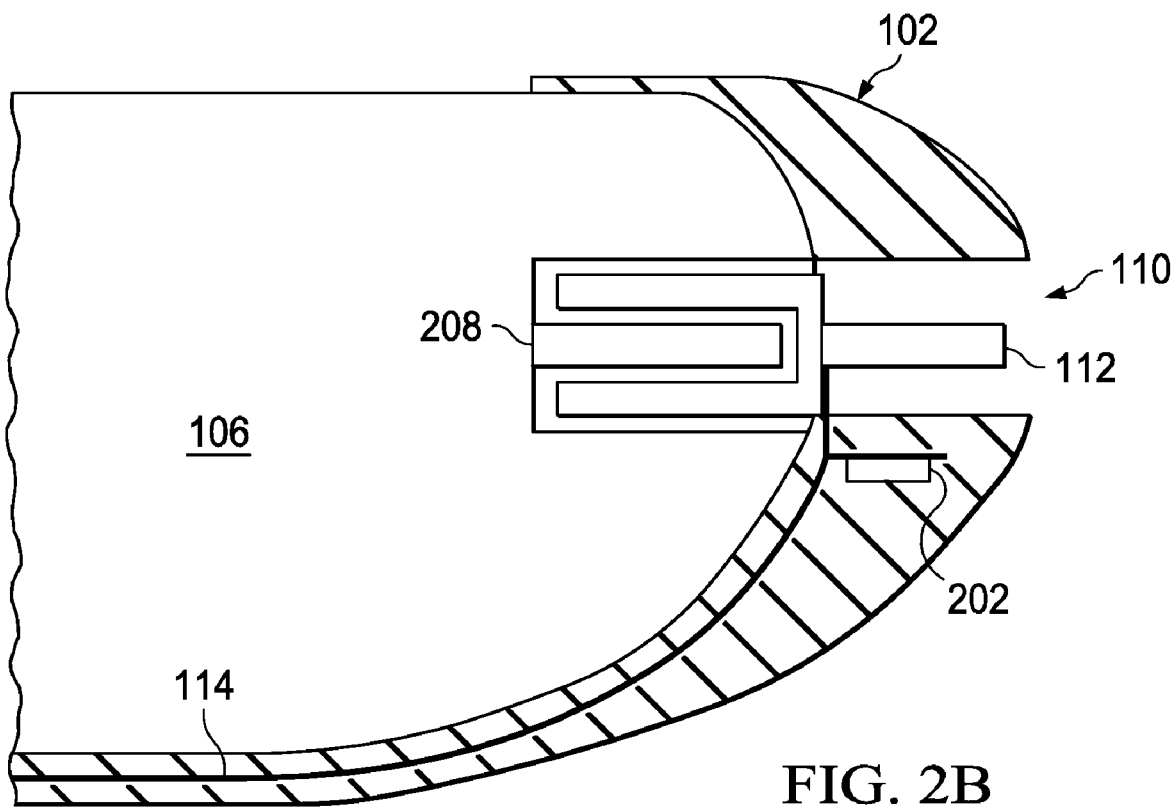
Figure 2C:
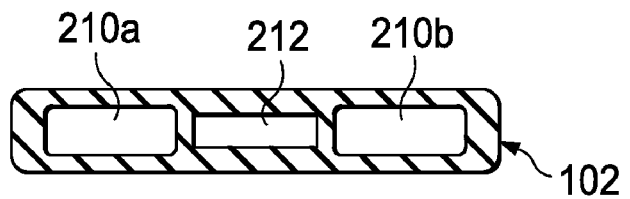

FIGS. 2A to 2C illustrate cross-sectional views of the cover 102 of FIG. 1. In particular, the views illustrate the components of the cover 102 that at least augment the mobile device 106 with the card 104. In FIG. 2A, the cover 102 includes a port-to-card converter module 202 (e.g., USB-to-microSD), a reader 204, and an antenna 206. The converter module 202 can include any software, hardware, and/or firmware that converts between card-processable signals and signals compatible with the mobile device 106. In the illustrated example, the converter module 202 converts between SD signals and USB signals. The reader 204 can include any software, hardware, and/or firmware that verifies or otherwise determines user information such as biometric information. In the illustrated example, the reader 204 determines fingerprints of a user and may verify whether the user has access to the card 104. In addition, the reader 204 may pass the biometric information to an application on the mobile device 106 (through the converter 202 and/or the connector) for, for example, to securely verify the identity of the device holder. The mobile host device 106 may include biometric identity verification for applications such as mobile banking. In some implementations, an application can use the biometric reader 204 to first register the user's biometric identity on first use and thereafter match the biometric identity of the device holder with the registered biometric identity. The secure storage of the biometric identity for the user may be provided by the removable secure card 104 or could be located on a special secure memory embedded in the cover. For example, when the user changes devices 106, the identity footprint may be erased from the initial device (if he removes the cover 102 and the card 104). In addition, another application running on the CPU of the cover 102 may also use the biometric data to secure access to certain features and/or services. The antenna 206 may wirelessly transmit and receive RF signals associated with the card 104. In the transaction-card implementations, the antenna 206 may extend the transaction range of the card 104 for wirelessly executing transactions. FIG. 2B is another illustration of a cross-sectional view of the cover 102. In this view, a connector 208 of the mobile device 106 is illustrated. For example, the connector 208 may be an iDock connector of an iPhone having 30 pins. FIG. 2C is yet another cross sectional view of the cover 102. In this view, the cover 102 includes the openings 214A and 214B for speakers included with the mobile device 106 and a cavity 212 for connecting a power supply to the connector 112 and the connector 208. In this case, the mobile device 106 may be charged using the connector 208 without removing the cover 102.

Figure 3A:
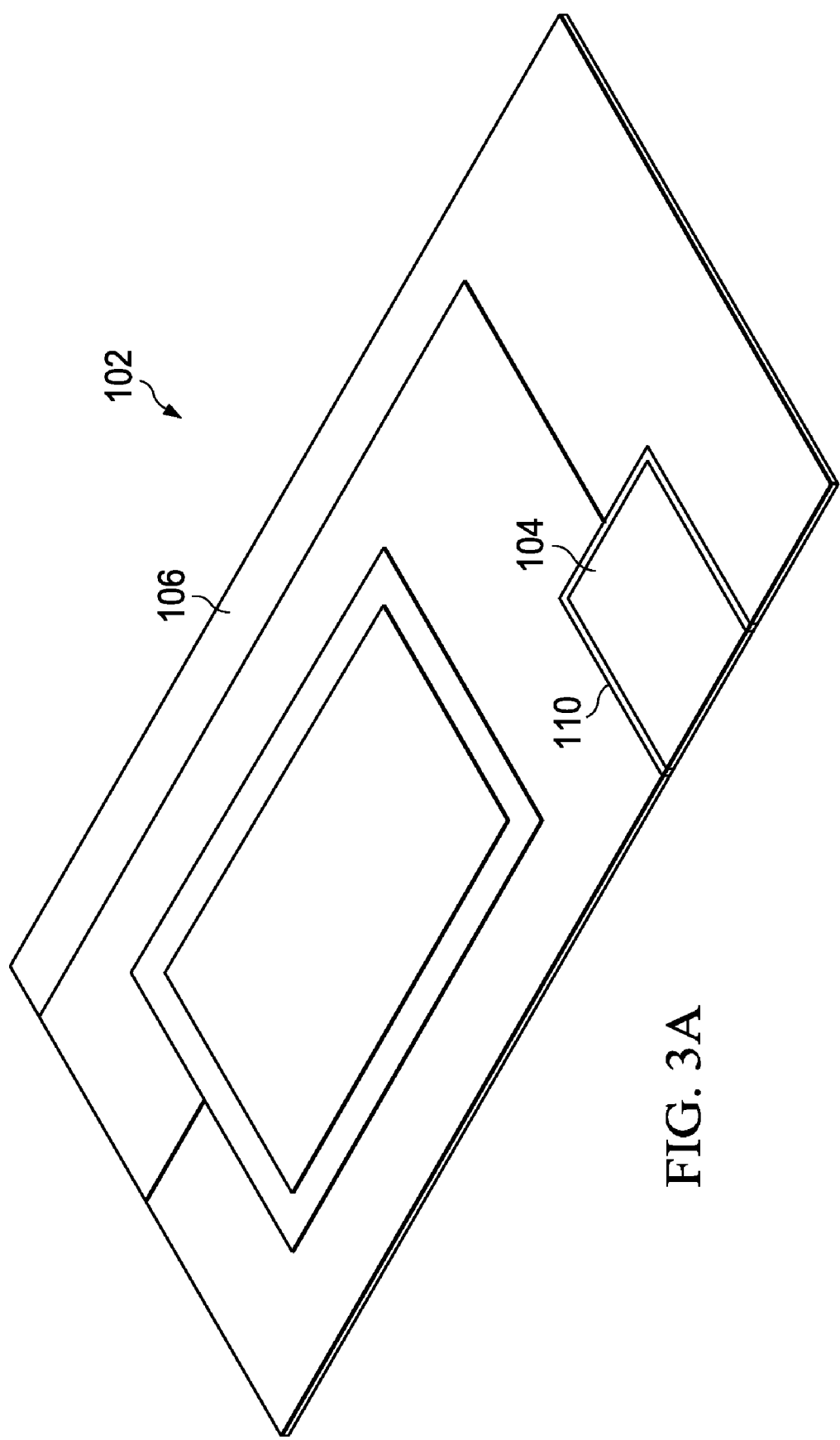

FIGS. 3A and 3B illustrate different implementations of the slot 110. In FIG. 3A, the slot 110 may be formed in the cover 102 such that a card 104 may be inserted and removed without lifting or otherwise removing at least a portion of the cover 102. In FIG. 3B, the slot 110 is formed on the inside of the cover 102 such that the cover is at least partially lifted or otherwise removed to insert and remove the card 104.

Figure 4:
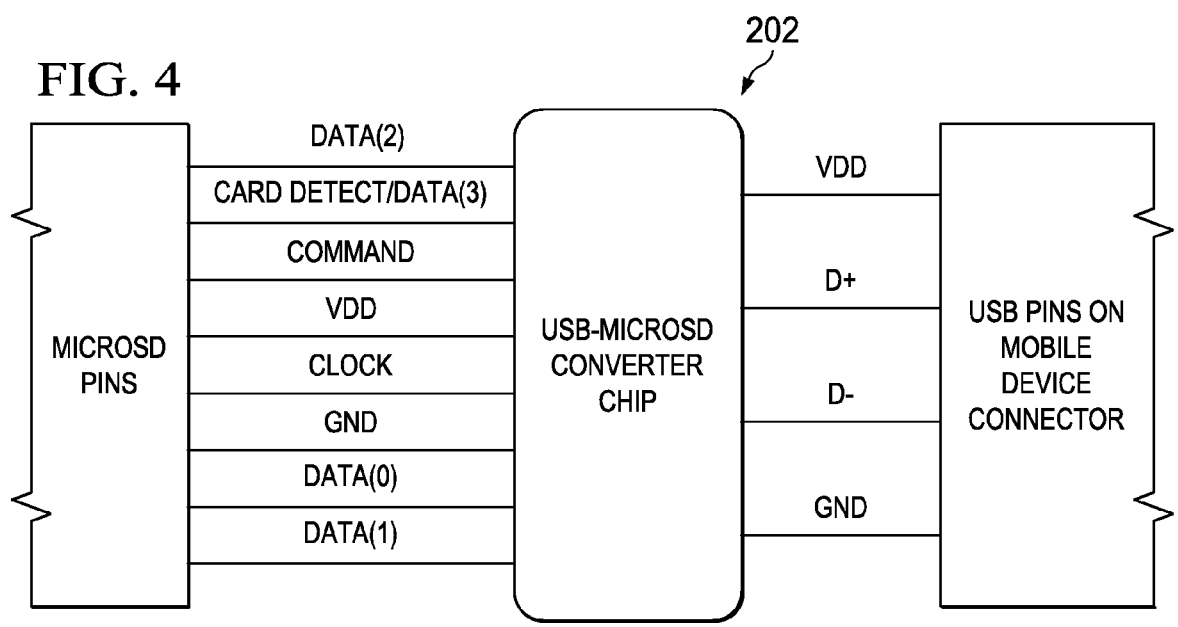
FIG. 4 illustrates an example converter module of the cover of FIG. 1.

FIG. 4 illustrates some implementations of the convert module 202 that converts between USB and SD signals. As illustrated, the converter module 202 may receive a plurality of inputs associated with the card 104 and convert the signals to a form compatible with the connector 208 of the mobile device 106. In some implementations, the converter module 202 may convert, for example, between data formats. In some implementations, the converter module 202 may pass inputs to corresponding outputs such as for VDD and GND.

Figure 5:
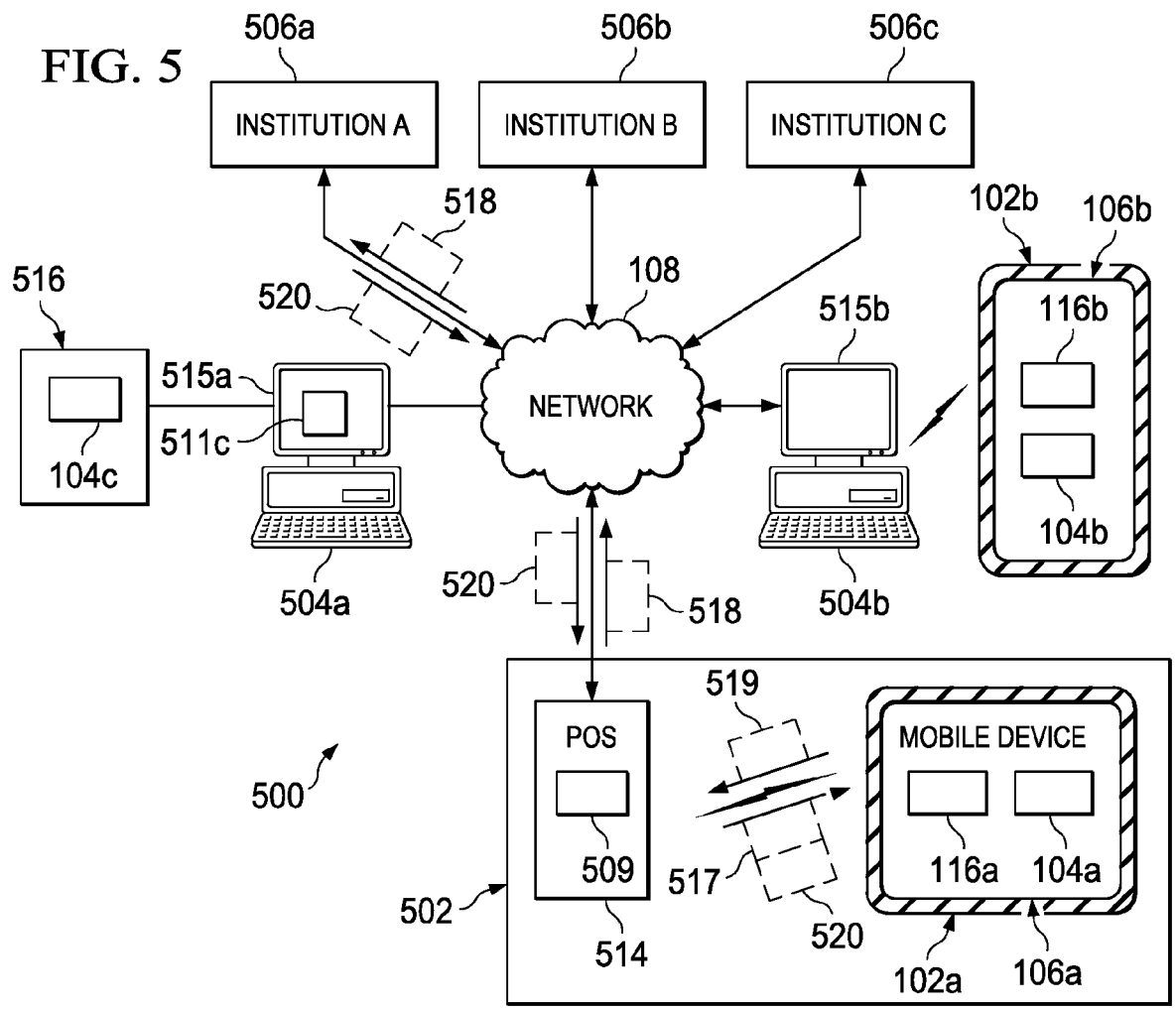
FIG. 5 is an example transaction system that transmits transaction information.

FIG. 5 is a block diagram illustrating an example transaction system 500 for wirelessly executing transactions with different enterprises using a single intelligent card. For example, the system 500 may include a single microSD card that executes transactions with different enterprises (e.g., financial institutions) independent of a mobile host device. For example, a single microSD card may execute a payment transaction with a financial institution, an access control transaction with a enterprise network, a ticket purchase transaction with a transit authority and/or an identity validation transaction with a government agency. In such implementations, each of the transactions can securely identify a user and user privileges with respect to the services being received from the different enterprises. Aside from microSD, the system 500 may include other mass storage interfaces that connect an intelligent card to a host device such as, for example, MMC, SD, USB, Firewire, and/or others. A host device may include a cellphone, a smartphone, a PDA, a MP3 device, a digital camera, a camcorder, a client, a computer, and/or other device that includes, for example, a mass memory interface. In some implementations, an intelligent card can be a card that inserts into a host device and executes transactions independent of the host device. In executing transactions, the intelligent card may use a dual interface that connects to both the host device through a physical interface (e.g., SD, MMC, USB) and external devices through a wireless connection (e.g., NFC, ISO 14443, Bluetooth). The intelligent card may control or otherwise operate one or more hardware components of the mobile host device (e.g., display, cellular radio technology) using the physical interface and wirelessly communicate with access terminals using the wireless interface. In some implementations, the intelligent card includes a plurality of user credentials with each identity set associated with a different institution. For example, the intelligent card may store user credentials for a credit card, a debit card, a prepaid card, a gift card, a checking account, and/or other user accounts. In addition, the intelligent card may also store user credentials for other applications such as loyalty (points for purchase), airline (access to clubs, check-in), state (driving license), memberships (clubs) and/or others where user credentials are used to identify user so that goods and/or services can be provided. By storing multiple user credentials in a single intelligent card, the system 500 may execute transactions with different institutions without requiring multiple instruments. In other words, a single intelligent card may operate as a logical wallet that locally stores information for different user accounts and switches between the different user accounts in response to at least an event. By providing an intelligent card, the system 500 may wirelessly execute transactions with institutions without either requiring additional hardware, software, and/or firmware and/or without requiring changes to existing hardware, software, and/or firmware for reader terminals to enable a user to wirelessly execute a transaction. In addition, the system 500 may eliminate, minimize or otherwise reduce the number of instruments possessed by an individual to execute transactions using different user accounts. In other words, the intelligent card may operate as a plurality of different instruments but implemented as a single device.

At a high level, the system 500 includes an offline store 502 and clients 504a and 504b coupled to institutions 506 through a network 108. While not illustrated, the system 500 may included several intermediary parties between the institution 506 and the network such as, for example, a transaction acquirer and/or a payment network host. The offline store 502 includes a mobile device 106a having a transaction card 104a and a Point of Sale (POS) device 514 that executes transactions with customers. The Access point 514 includes a Graphical User Interface (GUI) 509 for presenting information to and/or receiving information from users. In some implementations, the ACCESS POINT 514 may transmit a request to execute a transaction to the transaction card 104. The transaction card 104 may transmit transaction information to the ACCESS POINT 514. The client 504 includes the GUI 515 for presenting information associated with the system 500. The client 504a includes a card reader 516 that interfaces the transaction card 104c with the client 504a. The institution 506 may authorize the transaction based, at least in part, on information transmitted by the transaction card 104. The mobile device 106 includes a GUI 116 for presenting information associated with financial transactions.

The enterprise 502 is generally at least a portion of an enterprise having a physical presence (e.g., building) for operations. For example, the enterprise 502 may sell goods and/or services at a physical location (e.g., a brick-and-mortar store) directly to customers. In this example, the enterprise 502 buys or otherwise receives goods (e.g., produce) from distributors (not illustrated) and then may sell these goods to customers, such as users of the mobile device 106. In general, the enterprise 502 may offer face-to-face experiences with customers in providing goods and/or services. For example, the enterprise 502 may be a click-and-mortar store such that a user selects a good or service using the Internet and purchases and receives the good or service at the enterprise 502. The enterprise 502 may provide one or more of the following services associated with goods: inventory, warehousing, distribution, and/or transportation. As a result, the enterprise 502 may not immediately distribute goods received from distributors. The enterprise 502 may include a single retail facility, one or more retail facilities at a single geographic location, and/or a plurality of retail facilities geographically distributed. In some cases, two or more entities may represent portions of the same legal entity or affiliates. For example, the enterprise 502 and distributors may be departments within one enterprise. In summary, the enterprise 502 may wirelessly execute financial transactions with the mobile device 106.

The transaction card 104 can include any software, hardware, and/or firmware configured to wirelessly execute transactions with the access point 514 using one of a plurality of selectable user accounts. For example, the transaction card 104 may select user credentials associated with one of the plurality of selectable user accounts (e.g., financial accounts) and execute a contactless transaction with the access point 514 using the selected account and independent of the mobile device 106a. In other words, the transaction card 104 may wirelessly execute transactions without aspects of the transaction being executed by the mobile device 106. In addition, the transaction card 104 may locally-store user credentials and/or applications (e.g., payment applications, access applications) for a plurality of selectable user accounts. The transaction card 104 may dynamically switch between user credentials and payment applications in response to at least an event. A switching event may include a selection from a user through the GUI 116, completion of a transaction, detection of a type of signal, determining a type of purchase (e.g., groceries, clothes), change in geographic area (e.g., GPS), and/or other events. The different user accounts may include a credit card account (e.g., Visa, MasterCard), a retail account (e.g., Target, Dillard's), a prepaid card, a gift card, a bank card (e.g., Bank of America), an airline card, an identity card, a driving license, and/or others. In some implementations, the transaction card 104 may include user credentials for any combination of financial, retail, airline, corporate, state and/or other accounts. In some implementations, the transaction card 104 may locally-store applications for the plurality of selectable user accounts. For example, the transaction card 104 may execute a different application for each of the different user credentials. The different applications may execute transactions using different reader infrastructures, formats, protocols, encryption, type/structure of user credentials exchanged with the terminal, and/or other aspects.

The transaction card 104 may execute transactions with the access point 514 using short range signals such as NFC (e.g., ISO 18092/ECMA 340), ISO 14443, ISO 15693, Felica, MiFARE, Bluetooth, Ultra-wideband (UWB), Radio Frequency Identifier (RFID), and/or other signals compatible with retail payment terminals (e.g., access point 514). In some implementations, the transaction card 104 may include one or more chipsets that execute an operating system and security processes to independently execute the transaction. In doing so, the mobile device 106 does not require additional hardware, software, and/or firmware to wirelessly execution a transaction with the access point 514 such as an NFC transaction. In some implementations, the transaction card 104 may execute one or more of the following: dynamically switch between user credentials and/or applications in response to at least one or more events; wirelessly receive a request from the access point 514 to execute a transaction and/or transmit a response; translate between wireless protocols and protocols compatible with the transaction card 104; translate between transaction-card protocols and protocols compatible with mobile device 106; present and receive information (e.g., PIN request, PIN) from the user through the GUI 116; decrypt and encrypt information wirelessly transmitted between the transaction card 104 and the access point 514; execute applications locally stored in the transaction card 104; selectively switch the antenna of the transaction card 104 on and off based, at least in part, on one or more events; execute authentication processes based, at least in part, on information received, for example, through the GUI 116; transmit a host signature to access point 514 in response to at least a transaction challenge; store, at least in part, details of the transaction executed between the card 104 and the access point 514; generate and/or present alerts (e.g., audio-visual alerts) to the user through the GUI 116; generate and/or transmit wireless-message alerts to the institution 506 using the mobile device 106 if cellular capable; and/or others. In some implementations, the transaction card 104 may initiate a transaction in response to at least a user selecting a graphical element in the GUI 116. The transaction card 104 may initiate a transaction with the access point 514 in response to at least wireless request transmitted by the access point 514. In some implementations, the transaction card 104 may selectively switch the antenna between an on and off state in response to one or more events. The one or more events may include a user request, completion of transaction, insertion of card 104 different mobile device, location change, timer events, detection of incorrect PIN entered by the user, change of wireless network that the device is connected to, message received from the institution 506 using wireless communication methods such as SMS, and/or other events. For example, the transaction card 104 may receive one or more commands to switch the antenna off from a cellular network (not illustrated) through the mobile device 106.

In some implementations, the transaction card 104 may initiate a transaction in response to at least a user selecting a graphical element in the GUI 116. The transaction card 104 may initiate a transaction with the ACCESS POINT 514 in response to at least wireless request transmitted by the ACCESS POINT 514. In some implementations, the transaction card 104 may selectively switch the antenna between an on and off state in response to one or more events. The one or more events may include a user request, completion of transaction, insertion of card 104 in a different mobile device, location change, timer events, detection of incorrect PIN entered by the user, change of wireless network that the device is connected to, message received from the institution 506 using wireless communication methods such as SMS, and/or other events. For example, the transaction card 104 may receive one or more commands to switch the antenna off from a cellular network (not illustrated) through the mobile device 106. In some implementations, the transaction card 104 may request user identification such as a PIN, a user ID and password combination, biometric signature, and/or others.

In regards to translating between protocols, the transaction card 104 may process information in, for example, ISO 106416, a standard security protocol, and/or others. In this case, the transaction card 104 may translate between an NFC protocol (e.g., ISO 18092) and the transaction-card protocol. In some implementations, ISO 106416 commands may be encapsulated within interface commands used to transmit data between the host device 514 and the card 104. In addition, the transaction card 104 may interface the mobile device 106 through a physical interface such as MicroSD, Mini-SD SD, MMC, miniMMC, microMMC, USB, miniUSB, microUSB, firewire, Apple iDock, and/or others. In regard to security processes, the transaction card 104 may implement one or more encryption algorithms to secure transaction information such as card number (e.g., credit card number, debit-card number, bank account number), PIN, and/or other security related information. The security related information may include an expiry date, card verification code, user name, home phone number, user zip code and/or other user information associated with verifying an identity of the card holder. In some implementations, the transaction card 104 may execute private key (symmetric algorithms) such as DES, TDES and/or others or public key (asymmetric algorithms) such as RSA, elliptic curves, and/or others. In addition, the transaction card 104 may include memory (e.g., Flash, EEPROM) for storing user data, applications, offline Webpages, and/or other information. In regards to applications, the transaction card 104 may execute a locally stored application and present information to and received information from the user through the GUI 116. For example, the transaction card 104 may execute an application used to synchronize an account balance with the institution 506 using the GUI 116 and the mobile device 106. Alternatively or in addition to applications, the transaction card 104 may present offline Web pages to the user using the GUI 116. In response to initiating a transaction, the transaction card 104 may automatically present an offline Web page through the GUI 116. In some implementations, the offline Web page can be associated with an institution 506. In some implementations, the transaction card 104 can be backward compatible and operate as a mass storage device. For example, if the wireless interface of the transaction card 104 is not available or deactivated, the transaction card 104 may operate as a mass storage device enabling users to access data stored in the memory component (e.g., Flash). In some implementations, the transaction card 104 can execute a set of initialization commands in response to at least insertion into the mobile device 106. These initialization commands may include determining device related information for the mobile device 106 (e.g., phone number, signature, connected network information, location information and other available properties), determining user relating information (e.g., PIN code, activation code), incrementing counters, setting flags and activating/deactivating functions according to pre-existing rules and/or algorithms.

In some implementations, the transaction card 104 may automatically execute one or more fraud control processes. For example, the transaction card 104 may identify an operational change and automatically transmit a notification to the financial institution based, at least in part, on the identified change. The transaction card 104 may execute two fraud control processes: (1) determine a violation of one or more rules; and (2) automatically execute one or more actions in response to at least the violation. In regards to rules, the transaction card 104 may locally store rules associated with updates to operational aspects of the transaction card 104. For example, the transaction card 104 may store a rule indicating a change in mobile host device 106 is an operational violation. In some implementations, the transaction card 104 may store rules based, at least in part, on updates to one or more of the following: phone number of host device 106; MAC address of host device 106; network wirelessly connected to host device 106; location of host device; and/or other aspects. In response to one or more events matching or otherwise violating rules, the transaction card 104 may execute one or more processes to substantially prevent or otherwise notify the institutions 506 of potentially fraudulent activity. For example, the transaction card 104 may execute a command to block an associated user account and/or the transaction card 104. Alternatively or in addition, the transaction card 104 may transmit a command to the institution 506 to call the mobile host device 106. In some implementations, the transaction card 104 may execute a command based, at least in part, on an event type. In some examples, the transaction card 104 may initiate a call with the institution 506 in response to at least a change in number of the host device 106. In some examples, the transaction card 104 may re-execute an activation process in response to at least a specified event type. An activation process may include activating the transaction card and/or financial account as discussed in more detail with respect to FIG. 13. In some implementations, the transaction card 104 may execute a command to disconnect the GUI 116 from the transaction card 104. The transaction card 104 may present a disconnection notification through the GUI 116 prior to executing the command. In some implementations, the transaction card 104 may transmit a command to the institution 506 to deactivate an account associated with the card 104.

In some implementations, the access point 514 may transmit a transaction request 517 to the transaction card 512 for information to generate an authorization request 518. In response to at least the transaction request, the transaction card 512 may transmit one or more transaction responses 519 identifying information associated with a user account. In some implementations, the access point 514 may transmit a request 518 to authorize a transaction to the institution 506. The authorization information may include an account number, a transaction amount, user credentials, and/or other information. In response to at least the transaction request 518, the institution 506 may transmit an authorization response 520 to the access point 514. In some implementations, the access point 114 may transmit the response 520 to the transaction point 512. The transaction response 520 may include, for example, a receipt presentable to the user through the GUI 116a. In some implementations, the institution 506 may transmit the authorization response 120 to the mobile device through a cellular core network (see FIG. 7). In this implementation, the institution 506 may have stored the association between the mobile device 106 and the transaction card 104 during the user sign-up process, automatically upon user activation of the card 104 when, for example, the card 104 is initially inserted into the mobile device 106, and/or other event. In the illustrated implementation, the access point 514 includes the GUI 509.

The GUI 509 comprises a graphical user interface operable to allow the user of the access point 514 to interface with at least a portion of the system 500 for any suitable purpose, such as a user entering transaction information (e.g., PIN, transaction acceptance) and/or and presenting transaction information (e.g., transaction amount). Generally, the GUI 509 provides the particular user with an efficient and user-friendly presentation of data provided by or communicated within the system 500 and/or also an efficient and user-friendly means for the user to initiate a wirelessly transaction with the transaction card 104. The GUI 509 may present a series of screens or displays to the user to, for example, accept a transaction and enter security information such as a PIN.

In some implementations, the transaction card 104 can be implemented differently. The transaction card 104 may be implemented as a KeyFOB and remains live outside the mobile device 106 as a FOB. In this case, the transaction card 104 may be passive and powered from an induction magnetic field generated by the access point 514. The transaction card 104 may be implemented in the form of an industrial integrated circuit chip for mounting on a PCB or IC chip. In some implementations, the transaction card 104 may be implemented in the form of a self contained desktop standalone unit powered by external AC adapter or stand alone box. In some implementations, the transaction card 104 can be implemented as an external attachment to a mobile device 106 (e.g., case) and connected to the mobile device using a peripheral interface such as USB, serial port, the iDock apple proprietary interface, and/or other interface.

In some implementations, the transaction card 104 may operate in accordance with one or more of the following modes: active card emulation; active reader; self train; killed; memory; inactive; and/or other modes. The transaction card 104 may operate active-card-emulation mode to convert the mobile device 106 to a contactless payment device loaded with a financial vehicle (FV) that may be, for example, a credit card, a debit card, a gift card and/or other retail payment product. In this mode, the transaction card 104 may execute payment transactions at any capable retail payment terminal (e.g., ACCESS POINT 514) that accepts contactless payment transactions. For example, such terminals may be contactless-enabled terminals currently being deployed by merchants under MasterCard's paypass, Visa's paywave programs, Amex ExpressPay, Discover Zip, and/or other payment programs. After the antenna of the transaction card 104 is activated in this mode, a merchant terminal may detect the presence of a host device with the transaction card 104 and prompt the user to authorize a transaction such as by entering a PIN, signing on a terminal interface, confirming the amount of the transaction, and/or other action. In this mode, such transactions may be handled as a normal card-present transaction. In other words, the access point 514 may perceive the transaction card 104 as a contactless plastic payment card and may communicate with the transaction card 104 as a contactless plastic payment card to execute payment transactions. In these implementations when the card 104 operates in an active-card emulation mode, the access point 514 can wirelessly communicate with the transaction card 104 using the same signals used to communicate with a contactless plastic payment card. In this active-card emulation mode, the transaction card 104 emulates a contactless plastic payment card and may be backward compatible with the access point 514. In this implementation, neither the terminal nor the financial institution may require additional software to execute the transaction. In addition, the transaction card 104 in this mode may be used for other applications such as physical access control (to open gates either in a corporate environment or in a transit environment), logical access control (to request network access via a PC), application access control (to buy access for amenities such as transportation, movies or wherever payment needs to be made to gain access to a facility), and/or other applications.

In the active-reader mode, the transaction card 104 may convert the mobile device 106 to a contactless reader device capable of receiving data when in range of a transmitting terminal (e.g., access point 514). In some implementations, this mode can require special NFC hardware with reader mode capability as part of the transaction card 104. In the event that the mobile device 106 is proximate (e.g., 10 cm or less) a transmitting terminal, the reader mode of the transaction card 104 may activated and prompt the user for authorization to receive data through the GUI 116. This mode may only be suitable for mobile devices 106 with a UI element, such as an OK button and a screen, an LED to indicate that data reception is being requested, and/or other interfaces. Once the user authorizes the transmission, the transaction card 104 in this mode may receive, and locally store, process and may execute a transaction and/or forward received data to another entity. For example, the transaction card 104 in this mode may receive content through promotional posters, validating the purchase of a ticket, and/or others. For example, the transaction card 104 in this mode may function as a mobile POS terminal receiving transaction information from a plastic contactless card/FOB and instructing the access point 514 to prepare a transaction authorization request for the institution 506 through a cellular core network. Once the institution 506 authorizes the transaction, the mobile device 106 may display the confirmation of the transaction to the user through the GUI 116.

In regards to the self-train mode, the transaction card 104 may execute a version of the reader mode. In some implementations, the self-train mode can be activated by a special action (e.g., a needle point press to a small switch, entry of an administrative password via the GUI 116). In response to at least activating this mode, the transaction card 104 may be configured to receive personalization data over, for example, the short range wireless interface from another peer transaction card such as the plastic contactless cards compliant with this functionality and issued by the institution 506 or a specially prepared administrative card for this purpose. Personalization data received in this mode may include encrypted FV information that is stored in secured memory of the transaction card 104. In some implementations, the transaction card 104 in this mode may receive the FV information through a contactless interface of a transmitter and/or others. The transaction card 104 may then synthesize the FV information that corresponds to the user account and personalize an internal security module that includes, for example, payment applications for executing transactions with institutions 506 and associated user credentials. The self-train mode may be used to re-personalize the transaction card 104 in the field. In some implementations, all previous data can be deleted if the self-train mode is activated. The self-train mode may be a peer-to-peer personalization mode where the card 104 may receive personalization information from another transaction card 104. This mode may represent an additional personalization mode as compared with factory, store and/or Over-The-Air (OTA) personalization scenarios which may be server to client personalization scenarios. In some implementations, the self-train mode may be a peer-to-peer personalization mode where the transaction card 104 receives personalization information from another transaction card. Since two transaction cards 104 are used in this mode, this mode may be different from a server-to-client personalization scenario as with a factory, store, and OTA personalization.

In regards to the inactive mode, the transaction card 104 may temporarily deactivate the contactless interface. In some implementations, the inactive mode can be activated through the physical interface with the mobile device 106 such as a microSD interface. In response to at least the activation of the inactive mode, the transaction card 104 may temporarily behave as only a mass-memory card. In some implementations, the card 104 may also enter this state when the reset needle point is pressed. In this mode, the transaction card 104 may preserve locally-stored information including financial user data. In this mode, the transaction card 104 may execute the activation process and if successful may return to the active mode. Institutions 506 may use this mode to temporarily prevent usage in response to at least identifying at least potentially fraudulent activity.

In regards to the killed mode, the transaction card 104 may permanently deactivate the contactless interface. In some implementations, the killed mode is activated through the physical interface with the mobile device 106 such as a microSD interface. In response to at least the activation of the killed mode, the transaction card 104 may permanently behaves as a mass memory stick. In the event that the reset needle point is pressed, the transaction card 104 may, in some implementations, not be made to enter any other modes. In addition, the transaction card 104 may delete financial content in memory in response to at least this mode being activated. In some implementations, institutions 506 may use this mode to delete data from a transaction card 104 that is physically lost but still connected to the wireless network via the host device 106.

In regards to the memory mode, the transaction card 104 may operate as a mass memory stick such that the memory is accessible through conventional methods. In some implementations, the transaction card 104 may automatically activate this mode in response to at least being removed from the host device, inserted into a non-authorized host device, and/or other events. The transaction card 104 may be switched to active mode from the memory mode by, for example, inserting the card 104 into an authorized device or may be switched from this mode into the self-train mode to re-personalize the device for a new host device or a new user account. In some implementations, the memory mode may operate substantially same as the inactive mode.

In some implementations, the transaction card 104 may be re-personalized/updated such as using software device management process and/or a hardware reset. For example, the user may want to re-personalize the transaction card 104 to change host devices, to have multiple host devices, and/or other reasons. In regards to the software device management, the user may need to cradle the new host device with the transaction card 104 inserted to launch the software device management application. In some implementations, the software management application can be an application directly installed on the client 504, integrated as a plug-in to a normal synchronization application such as ActiveSync, available via a browser plug-in running on the plug-in provider's website, and/or other sources. The user may log into the application and verify their identity, and in response to verification, the application may allow access to a devices section in the device management application. The device management application may read the transaction card 104 and display the MAC addresses, signatures of the devices that he has inserted his plug-in to, and/or other device specific information. The mobile device 106 may be marked as active and the host device may be shown as disallowed or inactive. The application may enable the user to update the status of the new host device, and in response to at least the selection, the device management application may install the signature on the new host device and mark update the status as allowable in secure memory of the transaction card 104. The user may be able to also update the status of the mobile device 106 to disallowed. Otherwise, both devices may be active and the transaction card 104 may be switched between the two devices. In regards to the hardware reset process, the use may use the reset needle point press on the physical transaction card 104 to activate the self-train mode. In this mode, the financial data may be deleted and have to be reloaded. When the transaction card 104 is inserted into the new host device, the provisioning process may begin as discussed above.

The access point 514 can include any software, hardware, and/or firmware that wirelessly receive account information for executing a transaction with one or more institutions 506. For example, the access point 514 may be an electronic cash register capable of wirelessly transmitting transaction information with the transaction card 104a. The access point 514 may transmit information in one or more the following formats: 14443 Type A/B, Felica, MiFare, ISO 18092, ISO 15693; and/or others. The transaction information may include verification information, check number, routing number, account number, transaction amount, time, driver's license number, merchant ID, merchant parameters, credit-card number, debit-card number, digital signature and/or other information. In some implementations, the transaction information may be encrypted. In illustrated implementation, the access point 514 can wirelessly receive encrypted transaction information from the transaction card 104 and electronically send the information to one or more of the institutions 506 for authorization. For example, the access point 514 may receive an indication that a transaction amount has been accepted or declined for the identified account and/or request additional information from the transaction card 104.

As used in this disclosure, the client 504 are intended to encompass a personal computer, touch screen terminal, workstation, network computer, a desktop, kiosk, wireless data port, smart phone, PDA, one or more processors within these or other devices, or any other suitable processing or electronic device used for viewing transaction information associated with the transaction card 104. For example, the client 504 may be a PDA operable to wirelessly connect with an external or unsecured network. In another example, the client 504 may comprise a laptop that includes an input device, such as a keypad, touch screen, mouse, or other device that can accept information, and an output device that conveys information associated with transactions executed with the institutions 506, including digital data, visual information, or GUI 515. In some implementations, the client 504b can wirelessly communicate with the transaction card 104b using, for example, an NFC protocol. In some implementations, the client 504a includes a card reader 516 having a physical interface for communicating with the transaction card 104c. In some implementations, the card reader 516 may at least include an adapter that adapts the interface supported by the client 504 (e.g., USB, Firewire, Bluetooth, WiFi) to the physical interface supported by the card 104 (e.g., SD/NFC). In this case, the client 504a may not include a transceiver for wireless communication.

The GUI 515 comprises a graphical user interface operable to allow the user of the client 504 to interface with at least a portion of the system 500 for any suitable purpose, such as viewing transaction information. Generally, the GUI 515 provides the particular user with an efficient and user-friendly presentation of data provided by or communicated within the system 500. The GUI 515 may comprise a plurality of customizable frames or views having interactive fields, pull-down lists, and/or buttons operated by the user. The term graphical user interface may be used in the singular or in the plural to describe one or more graphical user interfaces and each of the displays of a particular graphical user interface. The GUI 515 can include any graphical user interface, such as a generic web browser or touch screen, that processes information in the system 500 and presents the results to the user. The institutions 506 can accept data from the client 504 using, for example, the web browser (e.g., Microsoft Internet Explorer or Mozilla Firefox) and return the appropriate responses (e.g., HTML or XML) to the browser using the network 108. In some implementations, the GUI 116c of the transaction card 104c may be presented through the GUI 515a of the client 504a. In these implementations, the GUI 515a may retrieve user credentials from the GUI 116c and populate financial forms presented in the GUI 515a. For example, the GUI 515a may present a forum to the user for entering credit card information to purchase a good through the Internet, and the GUI 515a may populate the form using the GUI 116c in response to at least a request from the user.

Institutions 506a-c can include any enterprise that may authorize transactions received through the network 108. For example, the institution 506a may be a credit card provider that determines whether to authorize a transaction based, at least in part, on information received through the network 506. The institution 506 may be a credit card provider, a bank, an association (e.g., VISA), a retail merchant (e.g., Target), a prepaid/gift card provider, an internet bank, a government entity, a club, and/or others. In general, the institution 506 may execute one or more of the following: receive a request to authorize a transaction; identify an account number and other transaction information (e.g., PIN); identify funds and/or a credit limit associated with the identified account; identify access privileges associated with the user account; determine whether the transaction request exceeds the funds and/or credit limit and/or violates any other rules associated with the account; transmit an indication whether the transaction has been accepted or declined; and/or other processes. In regards to banking, the institution 506 may identify an account number (e.g., bank account, debit-card number) and associated verification information (e.g., PIN, zip code) and determine funds available to the account holder. Based, at least in part, on the identified funds, the institution 506 may either accept or reject the requested transaction or request additional information. As for encryption, the institution 506 may use a public key algorithm such as RSA or elliptic curves and/or private key algorithms such as TDES to encrypt and decrypt data.

Figure 6:
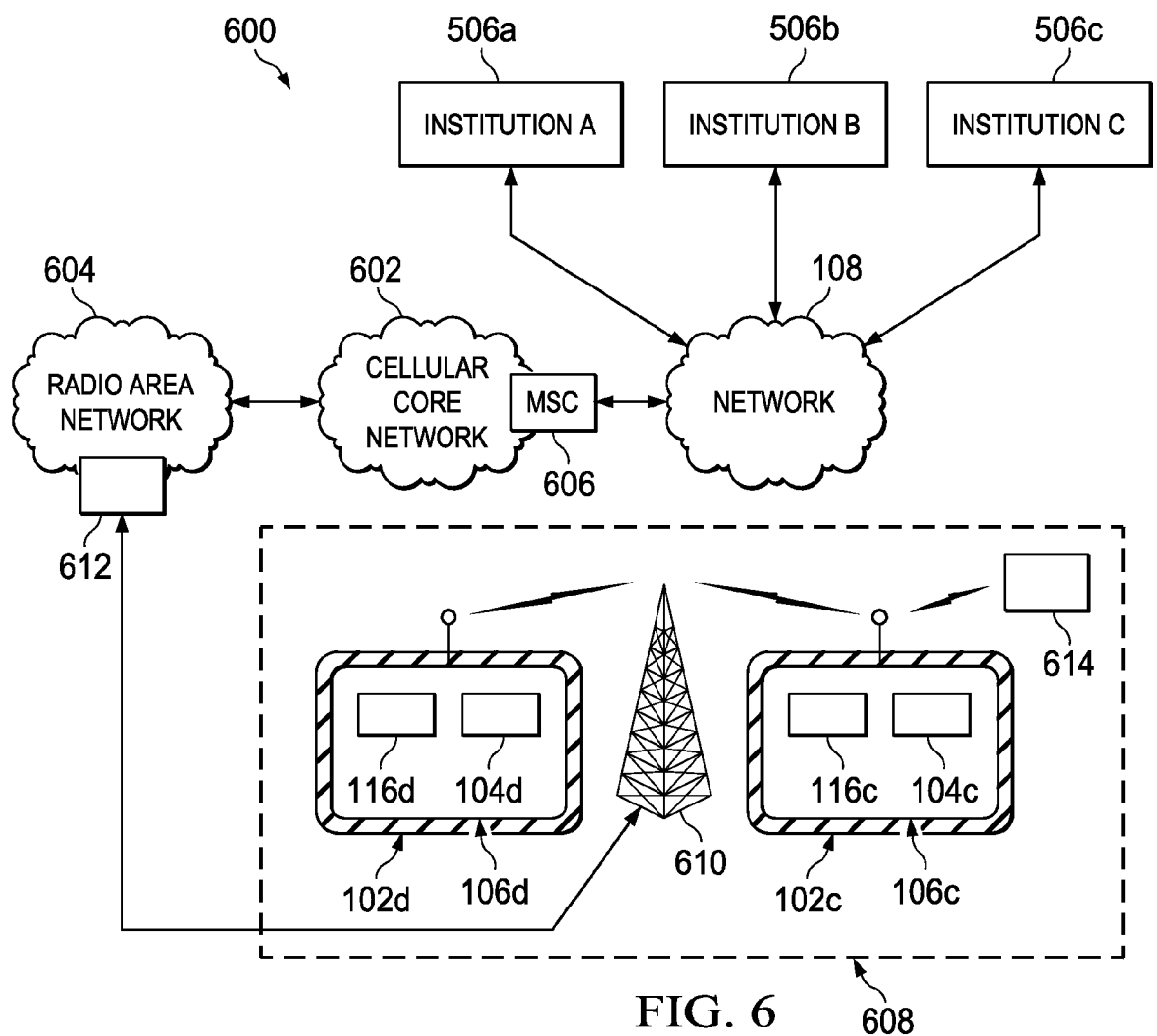
FIG. 6 is an example transaction system that transmits transaction information through a cellular network.

FIG. 6 is a block diagram illustrating an example transaction system 600 for wirelessly communicating transactions information using cellular radio technology. For example, the system 600 may wirelessly communicate a transaction receipt to a transaction card 104 using a mobile host device 110 and cellular radio technology. In some implementations, cellular radio technology may include Global System for Mobile Communication (GSM), Code Division Multiple Access (CDMA), Universal Mobile Telecommunications System (UMTS), and/or any other cellular technology. The institutions 106 may assign one or more mobile host devices 110 to a transaction card 104 in response to one or more events. In some examples, the user may register the one or more mobile devices 106 with the institution 506 in connection with, for example, requesting the associated transaction card 104. In some examples, the transaction card 104 may register the mobile host device 110 with the institution 506 in response to at least an initial insertion into the device 110. Regardless of the association process, the system 500 may use the cellular capabilities of the host devices 110 to communicate information between the institutions 106 and the transaction card 104. In using the cellular radio technology of the host device 110, the system 500 may communicate with the transaction card 104 when the card 104 is not proximate a retail device, such as the access point 514 of FIG. 1.

In the illustrated implementation, the cellular core network 602 typically includes various switching elements, gateways and service control functions for providing cellular services. The cellular core network 602 often provides these services via a number of cellular access networks (e.g., RAN) and also interfaces the cellular system with other communication systems such as the network 108 via a MSC 606. In accordance with the cellular standards, the cellular core network 602 may include a circuit switched (or voice switching) portion for processing voice calls and a packet switched (or data switching) portion for supporting data transfers such as, for example, e-mail messages and web browsing. The circuit switched portion includes MSC 606 that switches or connects telephone calls between radio access network (RAN) 604 and the network 108 or another network, between cellular core networks or others. In case the core network 602 is a GSM core network, the core network 602 can include a packet-switched portion, also known as General Packet Radio Service (GPRS), including a Serving GPRS Support Node (SGSN) (not illustrated), similar to MSC 606, for serving and tracking communication devices 106, and a Gateway GPRS Support Node (GGSN) (not illustrated) for establishing connections between packet-switched networks and communication devices 110. The SGSN may also contain subscriber data useful for establishing and handing over call connections. The cellular core network 602 may also include a home location register (HLR) for maintaining "permanent" subscriber data and a visitor location register (VLR) (and/or an SGSN) for "temporarily" maintaining subscriber data retrieved from the HLR and up-to-date information on the location of those communications devices 110 using a wireless communications method. In addition, the cellular core network 602 may include Authentication, Authorization, and Accounting (AAA) that performs the role of authenticating, authorizing, and accounting for devices 110 operable to access GSM core network 602. While the description of the core network 602 is described with respect to GSM networks, the core network 602 may include other cellular radio technologies such as UMTS, CDMA, and others without departing from the scope of this disclosure.

The RAN 604 provides a radio interface between mobile devices and the cellular core network 602 which may provide real-time voice, data, and multimedia services (e.g., a call) to mobile devices through a macrocell 608. In general, the RAN 604 communicates air frames via radio frequency (RF) links. In particular, the RAN 604 converts between air frames to physical link based messages for transmission through the cellular core network 602. The RAN 604 may implement, for example, one of the following wireless interface standards during transmission: Advanced Mobile Phone Service (AMPS), GSM standards, Code Division Multiple Access (CDMA), Time Division Multiple Access (TDMA), IS-54 (TDMA), General Packet Radio Service (GPRS), Enhanced Data Rates for Global Evolution (EDGE), or proprietary radio interfaces. Users may subscribe to the RAN 604, for example, to receive cellular telephone service, Global Positioning System (GPS) service, XM radio service, etc.

The RAN 604 may include Base Stations (BS) 610 connected to Base Station Controllers (BSC) 612. BS 610 receives and transmits air frames within a geographic region of RAN 604 and communicates with other mobile devices 106 connected to the GSM core network 602. Each BSC 612 is associated with one or more BS 610 and controls the associated BS 610. For example, BSC 612 may provide functions such as handover, cell configuration data, control of RF power levels or any other suitable functions for managing radio resource and routing signals to and from BS 610. MSC 606 handles access to BSC 612 and the network 108. MSC 606 may be connected to BSC 612 through a standard interface such as the A-interface. While the elements of RAN 604 are describe with respect to GSM networks, the RAN 604 may include other cellular technologies such as UMTS, CDMA, and/or others. In the case of UMTS, the RAN 604 may include Node B and Radio Network Controllers (RNC).

The contactless smart card 614 is a pocket sized card with embedded integrated circuits that process information. For example, the smart card 614 may wirelessly receive transaction information, process the information using embedded applications and wirelessly transmit a response. The contactless smart card 614 may wirelessly communicate with card readers through RFID induction technology at data rates of 106 to 848 kbit/s. The card 614 may wirelessly communicate with proximate readers between 10 cm (e.g., ISO/IEC 14443) to 50 cm (e.g., ISO 15693). The contactless smart card 614 operates independent of an internal power supply and captures energy from incident radio-frequency interrogation signals to power the embedded electronics. The smart card 614 may be a memory card or microprocessor card. In general, memory cards include only non-volatile memory storage components and may include some specific security logic. Microprocessor cards include volatile memory and microprocessor components. In some implementations, the smart card 614 can have dimensions of normally credit card size (e.g., 85.60×53.98×0.76 mm, 5×15×0.76 mm). In some implementations, the smart card 614 may be a fob or other security token. The smart card 614 may include a security system with tamper-resistant properties (e.g., a secure cryptoprocessor, secure file system, human-readable features) and/or may be configured to provide security services (e.g., confidentiality of stored information).

In some aspects of operation, the institution 506 may wirelessly communicate with the mobile host device 106 using the cellular core network 602. For example, the institution 506 may transmit information to the mobile host device 106 in response to at least an event. The information may include, for example, transaction information (e.g., transaction receipt, transaction history), scripts, applications, Web pages, and/or other information associated with the institutions 506. The event may include completing a transaction, determining a transaction card 104 is outside the operating range of a access point terminal, receiving a request from a user of the mobile host device, and/or others. For example, the institution 506 may identify a mobile host device 106 associated with a card 104 that executed a transaction and transmit transaction information to the mobile host device 106 using the cellular core network 602. In using the cellular core network 602, the institutions 506 may transmit information to the transaction card 104 without requiring an access point terminal being proximate to the card 104. In addition or alternatively, the institution 506 may request information from the mobile host device 106, the transaction card 104 and/or the user using the cellular core network 602. For example, the institution 506 may transmit a request for transaction history to the card 104 through the cellular core network 602 and the mobile host device 106. In some implementations, the mobile host device 106c may operate as a mobile Point of Sale (POS) terminal configured to wirelessly execute transactions with the smart card 614. For example, a vendor may be mobile (e.g., a taxi driver) and may include a mobile host device 106c with a transaction card 104c. In this example, the transaction card 104c may wirelessly receive account information from the smart card 614 and transmit an authorization request to the institution 506 using the mobile host device 106 and the cellular core network 602.

In some implementations, the system 600 may execute one or more of the modes discussed with respect to FIG. 5. For example, the transaction card 104 may be re-personalized/ updated using the cellular radio technology of the mobile host device 106. The user may want to re-personalize the transaction card 104 to change host devices, to have multiple host devices, and/or other reasons. In regards to the software device management, the user may transmit to the institution 506 a request to re-personalize the transaction card 104 using the cellular radio technology of the host device 106.

Figure 7:
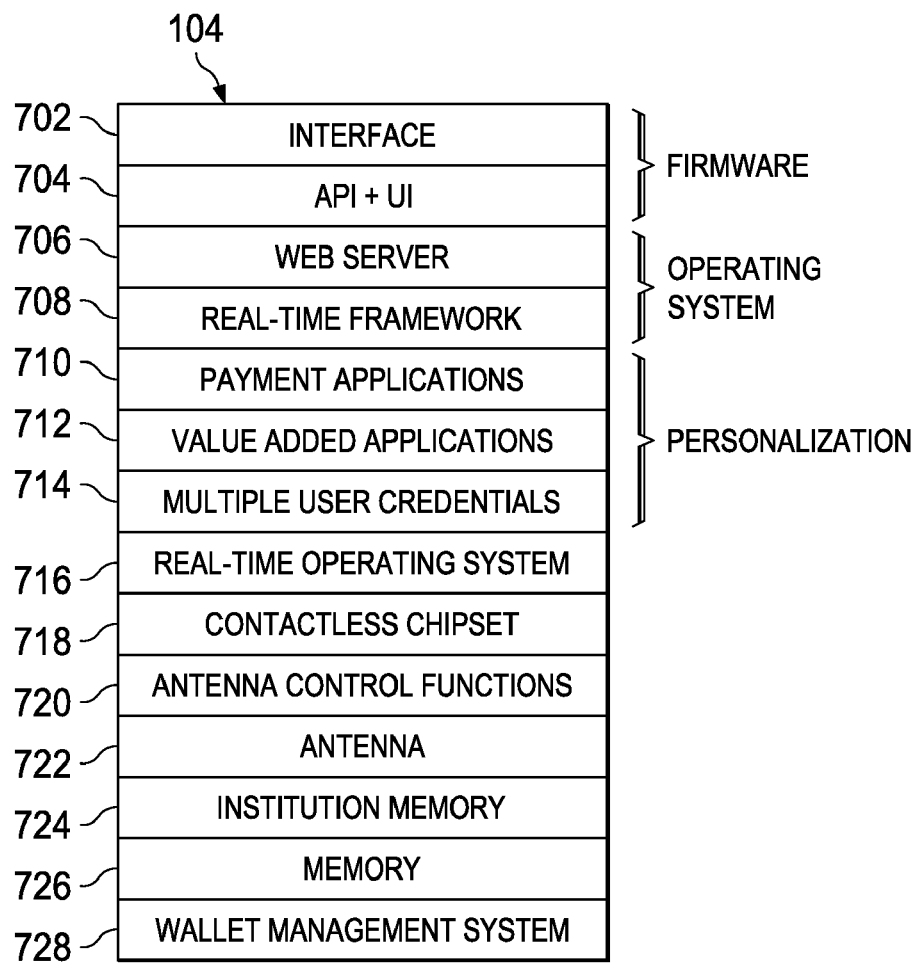
FIG. 7 is an example transaction card of FIG. 5 in accordance with some implementations of the present disclosure.

FIG. 7 illustrates is a block diagram illustrating an example transaction card 104 of FIG. 1 in accordance with some implementations of the present disclosure. In general, the transaction card 104 includes personalized modules that execute financial transactions independent of the mobile device 106. The illustrated transaction card 104 is for example purposes only, and the transaction card 104 may include some, all or different modules without departing from the scope of this disclosure.

In some implementations, the transaction card 104 can include an interface layer 702, an API/UI 704, a Web server 706, a real-time framework 708, transaction applications 710, value added applications 712, user credentials 714, real-time OS 716, contactless chipset 718, antenna control functions 720, antenna 722, institution memory 724, and free memory 726. In some implementations, a host controller includes the interface layer 702, he API/UI 704, the Web server 706, the real-time framework 708, the contactless chipset 718, and the antenna control functions 720. In some implementations, a security module includes the transaction applications 710 and the user credentials 714. The institution memory 724 and free memory 726 may be contained in Flash. In some implementations, the contactless chipset 718 may be integrated within the security module or operated as a standalone. The antenna 722 may be electronic circuitry.

The interface layer 702 includes interfaces to both the host device, i.e., physical connection, and the external world, i.e., wireless/contactless connection. In payment implementations, the wireless connection can be based on any suitable wireless standard such as contactless (e.g., ISP 14443 A/B), proximity (e.g., ISO 15693), NFC (e.g., ISO 18092), and/or others. In some implementations, the wireless connection can use another short range wireless protocol such as Bluetooth, another proprietary interfaces used by retail payment terminals (Felica in Japan, MiFare in Asia, etc.), and/or others. In regards to the physical interface, the interface layer 702 may physically interface the mobile device 106 using an SD protocol such as MicroSD, Mini-SD or SD (full-size). In some implementations, the physical interface may include a converter/adapter to convert between two different protocols based, at least in part, on the mobile device 106. In some implementations, the mobile device 106 may communicate using protocols such as USB, MMC, iPhone proprietary interface, or others.

The API/UI layer 704 can include any software, hardware, and/or firmware that operates as an API between the mobile device 106 and the transaction card 104 and as the GUI 111. Prior to executing transactions, the transaction card 104 may automatically install drivers in the mobile device 106 in response to at least insertion. For example, the transaction card 104 may automatically install a MicroSD device driver in the device 110 to enable the transaction card 104 to interface the mobile device 106. In some implementations, the transaction card 104 may install an enhanced device driver such as a Mass Memory with Radio (MMR) API. In this implementation, the interface can drive a class of plug-ins that contain mass memory as well as a radio interface. The MMR API may execute one or more of the following: connect/ disconnect to/from the MMR controller (Microcontroller in the plug-in); transfer data using MM protocol (e.g., SD, MMC, XD, USB, Firewire); send encrypted data to the MMR controller; receive Acknowledgement of Success or Error; received status word indicating description of error; turn radio on/off; send instruction to the transaction card 104 to turn the antenna on with specifying the mode of operation (e.g., sending mode, listening mode); transmit data such as send instruction to controller to transmit data via the radio; listen for data such as send instruction to controller to listen for data; read data such as send instruction to controller to send the data received by the listening radio; and/or others. In some implementations, MMR can be compliant with TCP/IP. In some implementations, API encapsulated ISO 110416 commands may be processed by the security module in addition to other commands.

In some implementations, the API can operate in accordance with the two processes: (1) the transaction card 104 as the master and the mobile device 106 as the slave; and (2) the card UI as the master. In the first process, the transaction card 104 may pass one or more commands to the mobile device 106 in response to, for example, insertion of the transaction card 104 into a slot in the mobile device 106, a transaction between the transaction card 104 and the access point 514, and/or other events. In some implementations, the transaction card 104 can request the mobile device 106 to execute one or more of following functions: Get User Input; Get Signature; Display Data; Send Data; Receive Data; and/or others. The Get User Input command may present a request through the GUI 111 for data from the user. In some implementations, the Get User Input may present a request for multiple data inputs. The data inputs may be any suitable format such as numeric, alphanumeric, and/or other strings of characters. The Get Signature command may request the mobile device 106 to return identification data such as, for example, a phone number, a device ID like an IMEI code or a MAC address, a network code, a subscription ID like the SIM card number, a connection status, location information, Wi-Fi beacons, GPS data, and/or other device specific information. The Display Data command may present a dialog to the user through the GUI 111. In some implementations, the dialog can disappear after a period of time, a user selection, and/or other event. The Send Data command may request the mobile device 106 to transmit packet data using its own connection to the external world (e.g., SMS, cellular, Wi-Fi). The Receive Data command may request the mobile device 106 to open a connection channel with certain parameters and identify data received through the connection. In some implementations, the command can request the mobile device 106 to forward any data (e.g., SMS) satisfying certain criteria to be forwarded to the transaction card 104.

In regards to the UI as master, the UI may execute one or more of the following commands: security module Command/Response; Activate/Deactivate; Flash Memory Read/Write; Send Data with or without encryption; Receive Data with or without decryption; URL Get Data/URL Post Data; and/or others. The security module commands may relate to security functions provided by the card and are directed towards the security module within the transaction card 104 (e.g., standard ISO 110416 command, proprietary commands). In some implementations, the commands may include encryption, authentication, provisioning of data, creation of security domains, update of security domain, update of user credentials after verification of key, and/or others. In some implementations, the commands may include non security related smart card commands such as, for example, read transaction history commands. The read transaction history command may perform a read of the secure memory 724 of the transaction card 104. In some implementations, certain flags or areas of the secure memory 724 may be written to after security verification. The Activate/Deactivate command may activate or deactivate certain functions of the transaction card 104. The Flash Memory Read/Write command may execute a read/write operation on a specified area of the non-secure memory 726. The Send Data with or without encryption command may instruct the transaction card 104 to transmit data using its wireless connection with, for example, the access point 514. In addition, the data may be encrypted by the transaction card 104 prior to transmission using, for example, keys and encryption capability stored within the security module. The Receive Data with or without decryption command may instruct the transaction card 104 to switch to listening mode to receive data from its wireless connection with the terminal/reader (e.g., access point 514). In some implementations, data decryption can be requested by the security module using, for example, keys and decryption algorithms available on the security module, i.e., on-board decryption. The URL Get Data/URL Post Data command may instruct the web server 706 to return pages as per offline get or post instructions using, for example, offline URLs.

The Web server 706, as part of the OS of the transaction card 104, may assign or otherwise associate URL style addressing to certain files stored in the memory 726 (e.g., flash) of the transaction card 104. In some implementations, the Web server 706 locates a file using the URL and returns the file to a browser using standard HTTP, HTTPS style transfer. In some implementations, the definition of the files can be formatted using standard HTML, XHTML, WML and/or XML style languages. The file may include links that point to additional offline storage locations in the memory 726 and/or Internet sites that the mobile device 106 may access. In some implementations, the Web server 706 may support security protocols such as SSL. The Web server 706 may transfer an application in memory 726 to the mobile device 106 for installation and execution. The Web server 706 may request the capabilities of the browser on the device 110 using, for example, the browser user agent profile, in order to customize the offline Web page according to the supported capabilities of the device and the browser, such as, for example, supported markup language, screen size, resolution, colors and such.

As part of the Real time OS, the real-time framework 708 may execute one or more functions based, at least in part, on one or more periods of time. For example, the real-time framework 708 may enable an internal clock available on the CPU to provide timestamps in response to at least requested events. The real-time framework 708 may allow certain tasks to be pre-scheduled such that the tasks are executed in response to at least certain time and/or event based triggers. In some implementations, the real-time framework 708 may allow the CPU to insert delays in certain transactions. In some implementation, a part of WAP standards called WTAI (Wireless Telephoney Application Interface) can be implemented to allow offline browser pages on the card 104 to make use of functions offered by the mobile device 106 (e.g., send/receive wireless data, send/receive SMS, make a voice call, play a ringtone etc.).

The transaction applications 710 can include any software, hardware, and/or firmware that exchanges transaction information with institutions using, in some instances, a pre-defined sequence and/or data format. For example, the transaction applications 710 may generate a response to a transaction request by selecting, extracting or otherwise including user credentials in the response, in a format compatible with an access points processing application. In some implementations, the transaction applications 710 may execute one or more of the following: transmit properties of the transaction card 104 in response to at least an identification request received from the access point 514; receive a request to execute a transaction from, for example, the access point 514; identify user credentials in the institution memory 724 in response to at least the request; generate a transaction response based, at least in part, on the user credentials; transmit the transaction response to the access point 514 using, for example, a contactless chipset; receive clear data, for example a random number, from the access point 514 and provide a response containing encrypted data by encrypting the clear data using the cryptographic capabilities of the secure element; transmit the encrypted data using the contactless chipset 718; increment a transaction counter with every transaction request received; transmit a value of the transaction counter in response to a request from the access point 514; store details of the transaction request received from the access point 514 into the transaction history area of the institution memory 724; transmit transaction history to the CPU of the intelligent card 104 in response to such a request; receive ISO 110416 requests from the CPU of the intelligent card 104; execute corresponding transactions using the secure element OS; provide responses back to the CPU; and/or other processes. In generating the transaction response, the transaction application 710 may generate the response in a format specified by the network associated with a institution 506 or a proprietary format owned and defined by the institution 506 and processable by the access point 514. The transaction request may include one or more of the following: user credentials (e.g., account number); expiry data, card verification numbers; a transaction count; and/or other card or user information. In some implementations, the transaction application 710 may comprises a browser application to enable transactions. The browser application 710 may be a browser that may be installed if the device 106 is either missing a browser or has a browser that is incompatible with the Web server 706 on the card 104. After installation of such browser 710, future communications between the mobile device 106 and the web-server 706 make use of the newly installed browser.

The real-time OS 716 may execute or otherwise include one or more of the following: real-time framework 708; a host process that implements the physical interface between the transaction-card CPU and the mobile device 106; an interface that implements the physical interface between the transaction-card CPU and the security module; a memory-management process that implements the ISO 110416 physical interface between the transaction-card CPU and the memory 724 and/or 726; an application-layer process that implements the API and UI capabilities; the Web server 706; antenna-control functions 720; power management; and/or others. In some implementations, the real-time OS 716 may manage the physical interface between the transaction-card CPU and the secure memory 724 that includes memory segmentation to allow certain memory areas to be restricted access and/or data buffers/pipes. In some implementations, the security module can include a security module OS provided by the security module Vendor and may be compliant with Visa and MasterCard specifications. The security module OS may structure the data in the security module to be compliant with Paypass and/or paywave specifications or any other available contactless retail payment industry specifications. In addition, the security module may store host device signatures and allow modes of the antenna 722 in the secure memory 724. In some implementations, the real-time OS 716 may include a microcontroller OS configured to personalizing the secure memory 724 such as by, for example, converting raw FV data (account number, expiry date, Card Verification Number (CVN), other application specific details) into secure encrypted information. In addition, the microcontroller OS may present the card 104 as a MicroSD mass storage to the host device. The microcontroller OS may partition the memory into a user section and a protected device application section. In this example, the device application section may be used to store provider specific applications that either operate from this segment of the memory or are installed on the host device from this segment of the memory.

The security module chip may provide tamper-resistant hardware security functions for encryption, authentication, management of user credentials using multiple security domains, on-board processing capabilities for personalization, access and storage, and/or others. In some implementations, the security module chip can include the contactless chipset 718.

The contactless chipset 718 may provides the hardware protocol implementation and/or drivers for RF communication. For example, the contactless chipset 718 may include on-board RF circuitry to interface with an external world connection using a wireless/contactless connection. The wireless connection may be, for example, client to node (terminal/reader/base station), node to client (passive tag), or peer to peer (another transaction card 104).

The antenna control function 720 may controls the availability of the RF antenna. For example, the antenna control function 720 may activate/deactivate the antenna 722 in response to, for example, successful authentication, completion of a routine established by the OS 716, and/or other event. The antenna 722 may be a short range wireless antenna connected to an NFC inlay via a software switch such as a NAND Gate or other element.

The wallet management system 728 may selectively switch between the multiple credentials 714 when executing transactions. For example, the wallet management system 728 may identify a default account, switching rules, and/or other information. In some implementations, the wallet management system 728 may automatically switch to default user credentials in response to at least an event such as completion of a transaction using non-default credentials. The switching rules may identifying user credentials and associated events such that the wallet management system 728 switches to user credentials in response to at least determining an event.

Figure 8:
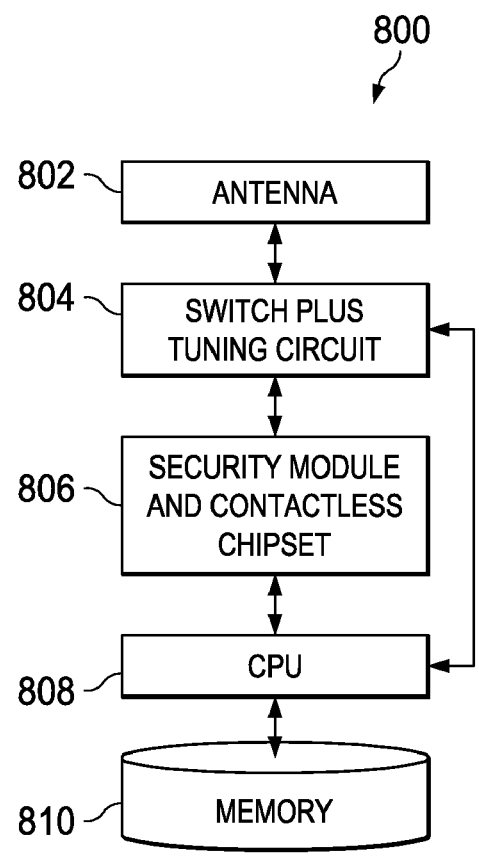
FIG. 8 is an example intelligent card that selectively switching an antenna.

FIG. 8 is a block diagram illustrating an example intelligent card 800 in accordance with some implementations of the present disclosure. For example, the transaction card of FIG. 1 may be implemented in accordance with the illustrated intelligent card 800. In general, the intelligent card 800 may independently access services and/or transactions. The intelligent card 800 is for illustration purposes only and may include some, all, or different elements without departing from the scope of the disclosure.

As illustrated, the intelligent card 800 includes an antenna 802, a switch plus tuning circuit 804, a security module and contactless chipset 806, a CPU 808 and memory 810. The antenna 802 wirelessly transmits and receives signals such as NFC signals. In some implementations, the switch plus tuning circuit 804 may dynamically adjust the impedance of the antenna 802 to tune the transmit and/or receive frequency. In addition, the switch plus tuning circuit 804 may selectively switch the antenna 802 on and off in response to at least a command from the CPU 808. In some implementations, the antenna 802 can be a short range wireless antenna connected to an NFC inlay via a software switch such as an NAND Gate or other element to allow for code from the CPU 808 to turn the antenna 802 on and off. In some implementations, the card 800 may include an NFC inlay (not illustrated) that can be a passive implementation of NFC short range wireless technology deriving power from the reader terminal in order to transmit data back or a stronger implementation using an eNFC chipset to power active reader mode and self-train mode. In addition, the card 800 may include an external needle point reset (not illustrated) that prompts the CPU 808 to depersonalize the memory or secure element.

The CPU 808 may transmit the switching command in response to an event such as a user request, completion of a transaction, and/or others. When switched on, the security chip and contactless chipset 806 is connected to the antenna 802 and executes one or more of the following: format signals for wireless communication in accordance with one or more formats; decrypt received messages and encrypt transmitted messages; authenticate user credentials locally stored in the memory 810; and/or other processes. The memory 810 may include a secure and non-secured section. In this implementation, the secure memory 810 may store one or more user credentials that are not accessible by the user. In addition, the memory 810 may store offline Web pages, applications, transaction history, and/or other data. In some implementations, the memory 810 may include Flash memory from 64 MB to 32 GB. In addition, the memory 810 may be partitioned into user memory and device application memory. The chipset 806 may include a security module that is, for example Visa and/or MasterCard certified for storing financial vehicle data and/or in accordance with global standards. In addition to a user's financial vehicle, the secure element may store signatures of allowed host devices and/or antenna modes.

In some implementations, the CPU 808 may switch the antenna 802 between active and inactivate mode based, at least in part, on a personalization parameter defined by, for example, a user, distributor (e.g., financial institution, service provider), and/or others. For example, the CPU 808 may activate the antenna 802 when the intelligent card 800 is physically connected to a host device and when a handshake with the host device is successfully executed. In some implementations, the CPU 808 may automatically deactivate the antenna 802 when the intelligent card 800 is removed from the host device. In some implementations, the antenna 802 is always active such that the intelligent card 800 may be used as a stand-alone access device (e.g., device on a keychain). In regards to the handshaking process, the CPU 808 may execute one or more authentication processes prior to activating the intelligent card 800 and/or antenna 802 as illustrated in FIG. 7. For example, the CPU 808 may execute a physical authentication, a device authentication, and/or a user authentication. For example, the CPU 808 may activate the antenna 802 in response to at least detecting a connection to the physical interface with the host device (e.g., SD interface) and successful installation of the device driver for mass memory access (e.g., SD device driver) on the host device. In some implementations, device authentication may include physical authentication in addition to a signature comparison of a device signature stored in memory (e.g., security module (SE)) that was created during first-use (provisioning) to a run-time signature calculated using, for example, a unique parameter of the host device. In the event no host device signature exists in the memory, the CPU 808 may bind with the first compatible host device the card 800 is inserted into. A compatible host device may be a device that can successfully accomplish physical authentication successfully. If a host-device signature is present in the memory, the CPU 808 compares the stored signature with the real-time signature of the current host device. If the signatures match, the CPU 808 may proceed to complete the bootstrap operation. If the signatures do not match, host device is rejected, bootstrap is aborted and the card 800 is returned to the mode it was before being inserted into the device.

User authentication may include verification of physical connection with a user using a PIN entered by the user, a x.509 type certificate that is unique to the user and stored on the host device, and/or other processes. Device and user authentication may verify a physical connection with device through comparison of a device signature and user authentication through verification of user PIN or certificate. In some implementations, the user can select a PIN or certificate at provisioning time. If this case, the CPU 808 may instantiate a software plug-in on the host device. For example, a software plug-in may request the user for his PIN in real time, read a user certificate installed on the device (e.g., x.509), and/or others. The operation of the software plug-in may be customized by the provider. Regardless, the returned user data may be compared with user data stored in the memory. In case of a successful match, the antenna 802 may be activated. In case of an unsuccessful match of a certificate, then card 800 is deactivated. In case of unsuccessful PIN match, the user may be requested to repeat PIN attempts until a successful match or the number of attempts exceeds a threshold. The disk provider may customize the attempt threshold.

In regards to network authentication, the host device may be a cellphone such that the card 800 may request network authentication prior to activation. For example, the card 800 may be distributed by a Wireless Network Operator (WNO) that requires a network authentication. In this example, a flag in memory may be set to ON indicating that network authentication is required. If the flag is set to ON, a unique identity about the allowed network is locally stored in memory such a Mobile Network Code for GSM networks, a NID for CDMA networks, a SSID for broadband networks, and/or identifiers. If this flag is ON, the CPU 808 in response to at least insertion may request a special software plug-in to be downloaded to the host device and instantiated. This software plug-in may query the host device to respond with network details. In some cases, the type of unique network identity employed and the method to deduce it from the host device may be variable and dependent on the network provider and capability of the host device. If the locally-stored ID matches the request ID, the CPU 808 activated the antenna 802 to enable access or otherwise services are denied.

Figure 9:
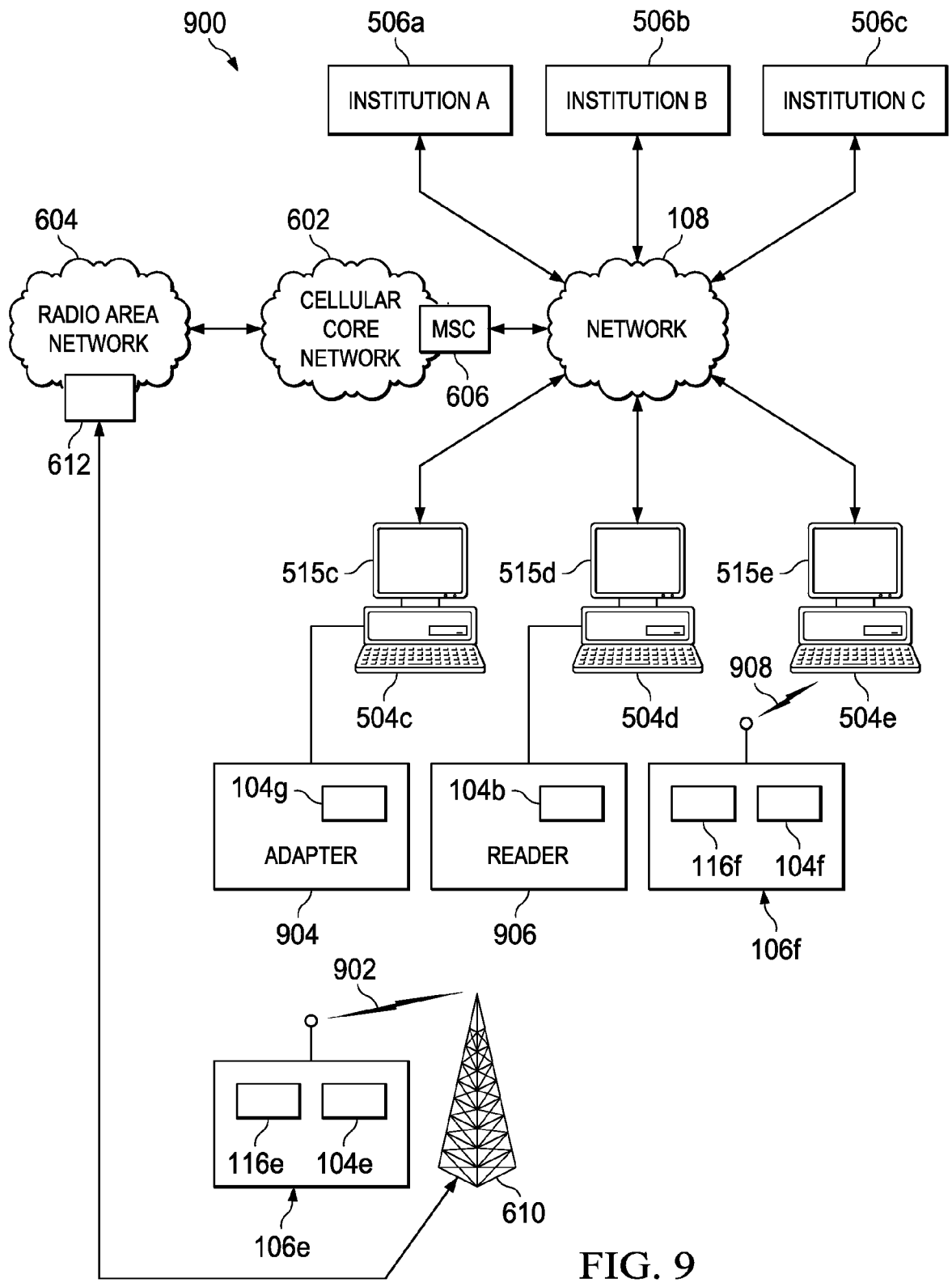
FIG. 9 is another example transaction system.

FIG. 9 illustrates an example transaction system 900 for wirelessly communicating transaction information using one of a plurality of interfaces. For example, the system 900 may interface the transaction card 104 using a wired or wireless interface. In regards to wired interfaces, the system 900 includes an adaptor 904 and a reader 906. The adaptor 904 can include any software, hardware, and/or firmware configured to translated between a format compatible with the card 104 and a format compatible with the client 504c. For example, the adaptor 904 may translate between microSD protocol and a USB protocol. The reader 906 can include any software, hardware, and/or firmware configured to directly interface with the card 104h. For example, the reader 906 may be a microSD reader such that the client 504d interfaces with the card 104h using a microSD protocol. In regards to wireless interfaces, the system 900 may include a cellular interface 902 and a short-range wireless interface 908. In regards to the cellular interface 902, the institutions 106 may wirelessly communicate with the transaction card 104e using the cellular radio technology of the mobile device 106e. For example, the cellular interface 902 may be a CDMA interface, a GSM interface, a UMTS interface, and/or other cellular interfaces. In regards to the short-range wireless interface 908, the institutions 106 may wirelessly communicate with the transaction card 104f using, for example, WiFi technology. The short-range wireless interface 908 may be an 1602.11 interface, a Bluetooth interface, and/or other wireless interface. In these implementations, the client 504e may include a transceiver used for wireless communication with the transaction card 104f.

Figure 10:
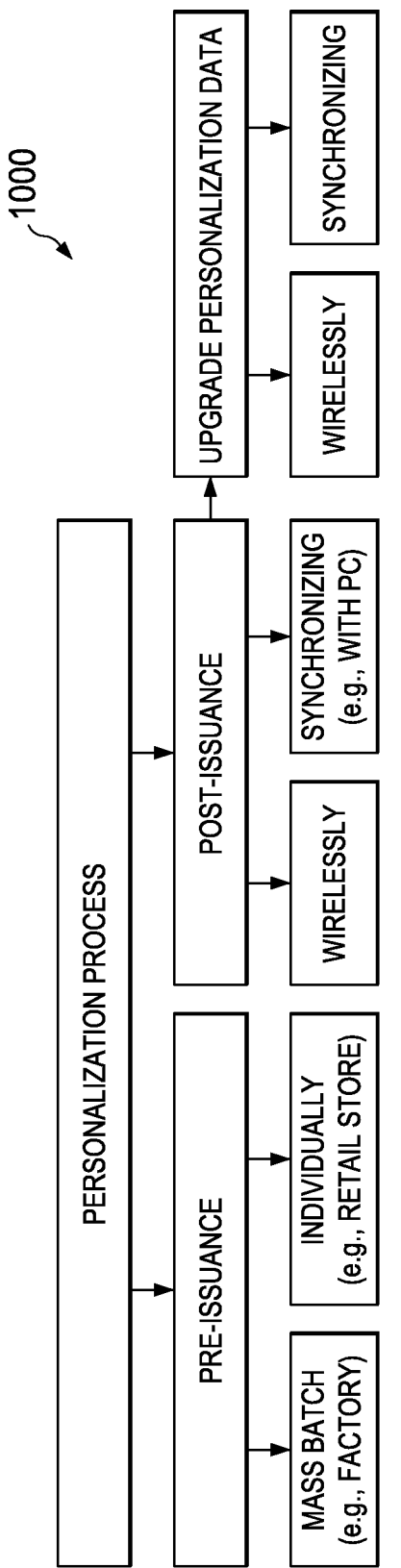
FIG. 10 is a schematic diagram illustrating personalization processes of intelligent cards.

FIG. 10 is a schematic diagram 1000 of personalization of a intelligent card (e.g., a transaction card, a memory card). In particular, the intelligent card may be personalized prior to being issued to a user, i.e., pre-issuance, or after being issued to a user, i.e., post-issuance. In regards to pre-issuance, intelligent cards may be personalized in mass batches at, for example, a factory. In this example, each intelligent card may be loaded with user credentials, security framework, applications, offline Web pages, and/or other data. In some implementations, a intelligent card may be personalized individually at, for example, a bank branch. In this case, a intelligent card may be individually loaded with data associated with a user after, for example, purchasing the disk. As for post issuance, the intelligent card may be personalized wirelessly. For example, the transaction card 104 may be personalized through a cellular connection established using the mobile device 106. In some implementations, an intelligent card may be personalized by synchronizing with a computer such as client 504. The transaction card 104 may receive from an enterprise at least associated with the institution 506 that personalization data prior to activation including user credentials, payment application and at least one of operational flags, rule table or user interface. The personalization data present in the card may be updated after activation using at least one of the following methods: wireless or over the air messages containing special and secure update instructions; internet or client application running on a PC connected to the transaction card 104 via the host device or a card reader;

internet application wirelessly connecting to the transaction card 104 via the host mobile device or user interface application of the transaction card 104 itself, and/or other methods.

In some implementations, provisioning of the intelligent card can be based, at least in part, on the distribution entity (e.g., financial institution, wireless operator, user). For example, the intelligent card may be distributed by a financial institution such as a bank. In the bank implementation, the intelligent card can be pre-provisioned with user accounts. In this case, the intelligent card may be activated in response to at least initial insertion into a host device. The antenna mode may be set to physical authentication only by default. In some examples, the user may self-select a PIN authentication to prevent unauthorized use or through a PC cradle and plug-in management software if the host device does not have a screen and keyboard. In the wireless-operator implementation, the intelligent card may require device authentication before activation. In some examples, the user may provision financial data (e.g., credit or debit) using one of several methods. In addition, the user may add user authentication. In the user-provided implementation, the user may acquire the intelligent card from, for example, a retail store or other channels like OEM host device manufacturers. In this case, the user may activate the card in a plurality of different devices with provider selected provisioning.

In regards to activating for financial transactions, the intelligent card may be configured in memory mode when user acquires the disk from, for example a bank, a wireless operator, a third-party provider, and/or others. Activation of the card may include the following two levels: 1) physically, specifying antenna availability under a specific set of circumstances desired by the provider; and b) logically, at the financial institution signifying activation of the financial vehicle carried on the card. In some implementations, activation may be based, at least in part on device distributor, antenna availability selection, and/or type of host device as illustrated in Table 1 below.

TABLE 1

| Plug-in Seller and Mode of distribution | Plug-In Initial State and Antenna Availability Choice | Device Has No Screen/Keyboard | Device Has Screen & keyboard |
|---|---|---|---|
| FI: Financial Institution (bank or retailer) ships plug-in directly to the subscriber or through participating resellers/distributors etc. | Plug-In is in Memory Mode, It is fully personalized with user's account information (FV) and Antenna mode is set to Physical Authentication | Manual: User has to call FI's number to activate his account, the Device can only work with a single account. User can also access FI's site on the internet using another PC to activate his account | If the device is capable of wireless access, upon insertion, the plug-in spawns a web page and takes the user to FI's website. The user self activates his account by entering his account number and matching secret personal information (last 4 digits of SSN or home phone number for example). The user can also optionally select a PIN (change Antenna availability to user authentication) at the same time. If Internet connection is not available, the device can automatically dial a voice call to FI's number for account activation. If wireless connection is not available as well (device is only a PDA), the user has to fallback to manual activation (see left) |
| WNO: Wireless Network Operator Ships plug-in bundled with host device, User can select his preferred host device and plugin is bundled with it if user would like to avail of this service | Plug-In is in Memory Mode, it is partially personalized (device signature of the host device loaded to prevent user from changing host device) while FV information is not loaded. Antenna Availability is set to Device Authentication (plug-in can only used with host device it is shipped with) | Not Applicable | Assumption: Device has a functional wireless connection. Operator offers a bundled wallet management application. When user clicks the wallet management application, the user is invited to sign-up with operator's partner FI for a new account. Once sign-up is successful, account data is downloaded Over the Air or Over the Internet to the plugin and it is activated for use Device can use multiple FIs in this scenario and store multiple FVs. User can select to enter a PIN for an FV in the wallet |

TABLE 1-continued

| Plug-in Seller and Mode of distribution | Plug-In Initial State and Antenna Availability Choice | Device Has No Screen/ Keyboard | Device Has Screen & keyboard |
|---|---|---|---|
| WNO: Wireless Network Operator Ships plug-in as an accessory with an advice for compatible devices, User can select his preferred host device and attempt to operate his plug-in with, to avail of the service | Plug-In is in Memory Mode, it is unpersonalized. Antenna Availability is set to Network authentication is set to On. Plug-In will bind to first device it is inserted in and where network authentication is successful | Not Applicable | management application in order to convert Antenna availability to user and device authentication for that FV Plug-in is bound to a device signature. When removed from the device, the Antenna turns off and the plug-in turns into a simple mass memory stick. When Plug-in is inserted into another host device, the signature doesn't match and Antenna remains off. Assumption: Device has functional wireless connection. Plug-In will spawn an internet connection to the operator portal and the wallet management application will be downloaded upon user confirmation. User can reject download and choose to manually provision FV data by going to a third party wallet provider or directly to the FI website. Plug-In is bound to the device and to the network provider's network. If the same device is unlocked and used on another network, the plug-in will cease to operate and will revert back to memory mode. When removed from the device, the plug-in will revert to the memory mode. |
| OEM 1: Cellphone manufacturer | Device Authentication (device comes bundled with a cellphone) | Not Applicable | Option A: Device Manufacturer offers a wallet management application, rest of the process remains as above Option B: Wireless Operator offers a wallet management application. User goes to the wireless operator portal and downloads this application Over the Air. The rest of the process then remains the same as above Option C: User navigates to a third party wallet management application (example paypal or Google). Sign up is offered to participating FIs and FVs are personalized on the plug-in Over the Internet Option D: User navigates to FI's website and activates a new account which is personalized over the Internet on the plug-in |

TABLE 1-continued

| Plug-in Seller and Mode of distribution | Plug-In Initial State and Antenna Availability Choice | Device Has No Screen/ Keyboard | Device Has Screen & keyboard |
|---|---|---|---|
| OEM 2: Other manufacturer | Device Authentication | User has to cradle the device to the PC with an internet connection and sign-up on the PC by going to an FI's website directly. Account is downloaded over the internet via the cradle and then the device is activated. In this process, the plug-in is bound to the device signature. When removed from the host device, the antenna turns off When plugged into another device, the device signature fails and the device behaves like a mass memory device only | If the device has wireless connection (it is a wireless PDA): Same as above If the device has no wireless connection (it is an unconnected PDA): Same as left |

The illustrated chart is for example purposes only. The user may activate an intelligent card using the same, some, or different processes without departing from the scope of this disclosure.

In the illustrated implementations, the transaction card 104 may be upgraded to execute a wallet system using multiple user credentials. For example, the transaction card 104 may upgraded with, for example, the wallet management system 728 through a wireless or wired connection. In addition to upgrading the transaction card 104, additional user credentials may be loaded to the memory. In this case, the transaction card 104 may selectively switch between the different user credentials based, at least in part, on rules, user selections, events, and/or other aspects.

Figure 11B:
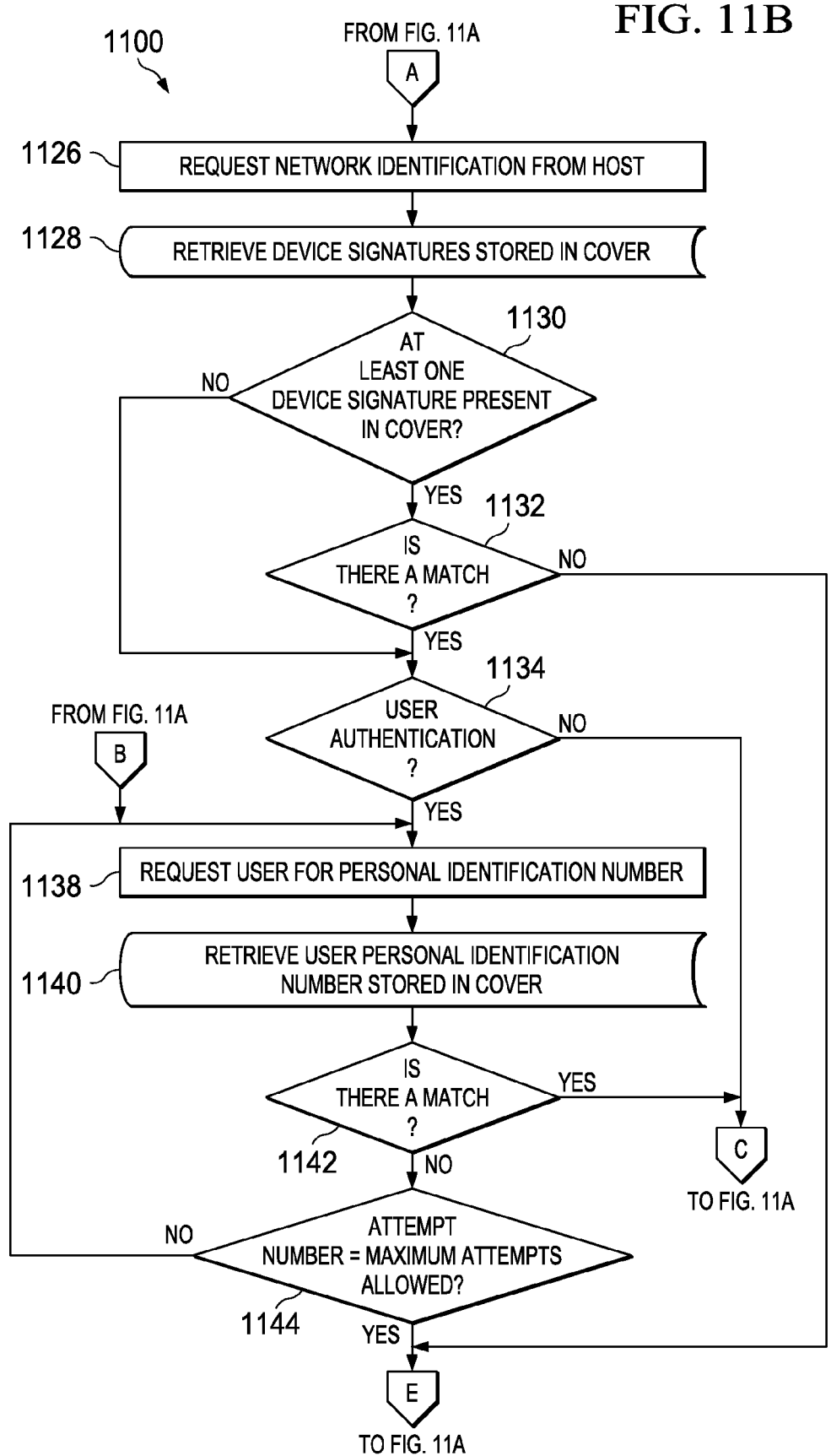
FIG. 11 is a flow chart illustrating an example method for initialize an intelligent card.

FIG. 11 is a flow chart illustrating an example method 1100 for automatically bootstrapping an intelligent card in response to at least insertion into a host device. In general, an intelligent card may execute one or more authentication procedures prior to activation. Many of the steps in this flowchart may take place simultaneously and/or in different orders as shown. System 500 or system 600 may use methods with additional steps, fewer steps, and/or different steps, so long as the methods remain appropriate.

Method 1100 begins at step 1102 where a cover attached to a host device is detected. For example, the transaction card 104 may detect insertion into the mobile device 106. If authentication is not required for any aspect of the intelligent card at decisional step 1104, then execution ends. If authentication is required for at least one aspect, then execution proceeds to decisional step 1106. If communication with the host device includes one or more errors, then, at step 1108, a failure is indicated to the user. In the example, the transaction card 104 may present an indication of a communication error to the user using the GUI 111. If a communication error is not detected at decisional step 1106, then execution proceeds to decisional step 1110. In some implementations, the intelligent card uploads an SD driver to the host device. If the intelligent card only requires physical authentication, then execution proceeds to decisional step 1104. If the network authentication flag is not set to on, then, at step 1114, the antenna is turned on and the intelligent card is updated with host-device signature. As for the example, the transaction card 104 may activate the antenna for wireless transactions and update local memory with the host-device signature. If the network authentication flag is turned on at decisional step 1104, then, at step 1116, the intelligent card transmits a request for the network ID to the host device. Next, at step 1118, the intelligent card retrieves a locally-stored network ID. If the stored network ID and the request network ID match at decisional step 1120, then the disk is activated at step 1122. If the two network ID's do not match, then the antenna is deactivated at step 1114.

Returning to decisional step 1110, if the authentication is not only physical authentication, then execution proceeds to decisional step 1124. If the authentication process includes device authentication, then, at step 1126, the intelligent card transmits a request for a network ID to the host device. At step 1128, the intelligent card retrieves a locally stored device signatures. If the intelligent card does not include at least one device signature, then execution proceeds to decisional step 1134. If the intelligent card includes one or more device signatures, then execution proceeds to decisional step 1132. If one of the device signatures matches the request network ID, then execution proceeds to decisional step 1134. If the signatures and the request network ID do not match, then execution proceeds to step 1122 for deactivation. If user authentication is not included in the authentication process, then execution proceeds to decisional step 1112 for physical authentication. If user authentication is included at decisional step 1134, then execution proceeds to step 1138.

Returning to decisional step 1124, if the authentication process does not include device authentication, then execution proceeds to decisional step 1136. If user authentication is not included in the process, then, at step 1122, the intelligent card is turned off. If user authentication is included, then, at step 1138, the intelligent card request a PIN number from the user using the host device. While the user authentication is described with respect to entering a PIN through the mobile host device, the user may be authenticated using other information such as biometric information (e.g., fingerprint). Again returning to the example, the transaction card 104 may present a request for the user to enter a PIN through the GUI 111. At step 1140, the intelligent card retrieves a locally-stored PIN. If the request PIN and stored PIN match at decisional step 1142, then execution proceeds to decisional step 1104 for physical authentication. If the request PIN and the stored PIN do not match at decisional step 1142, then execution proceeds to decisional step 1144. If the number of attempts have not exceeded a specified threshold, then execution returns to step 1138. If the number of attempts has exceed to the threshold, then the antenna is deactivated at step 1122. In the example, if the event that the transaction card 104 fails to authorize the device, network and/or user, the transaction card 104 may wirelessly transmit an indication to the associated financial institution using the cellular radio technology of the mobile host device 110. In this case, the illustrated method 1100 may be implemented as a fraud control process to substantially prevent unauthorized use of the transaction card 104.

Figure 12B:
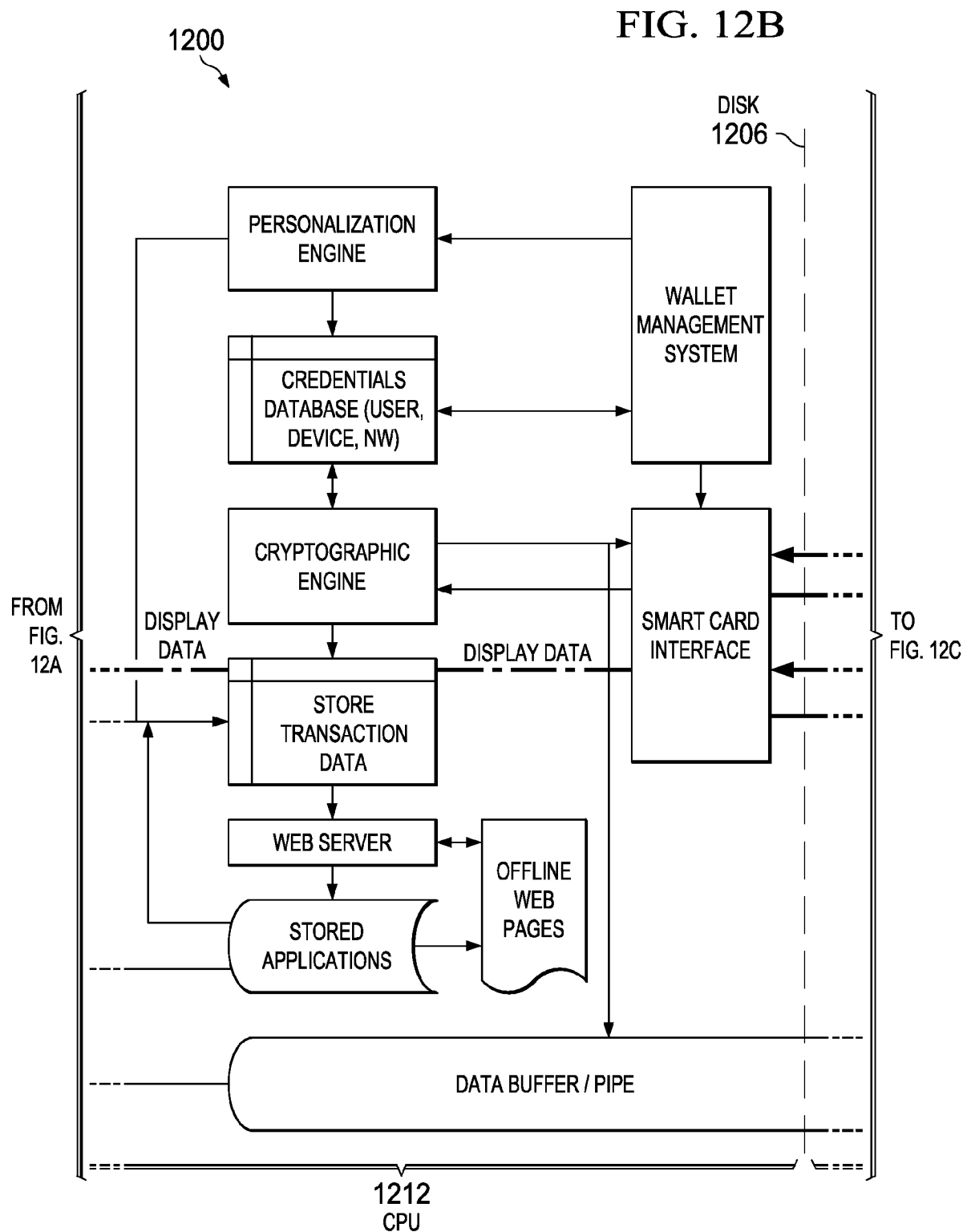
FIG. 12 is an example call flow illustrating call sessions with an intelligent card.
Figure 12C:
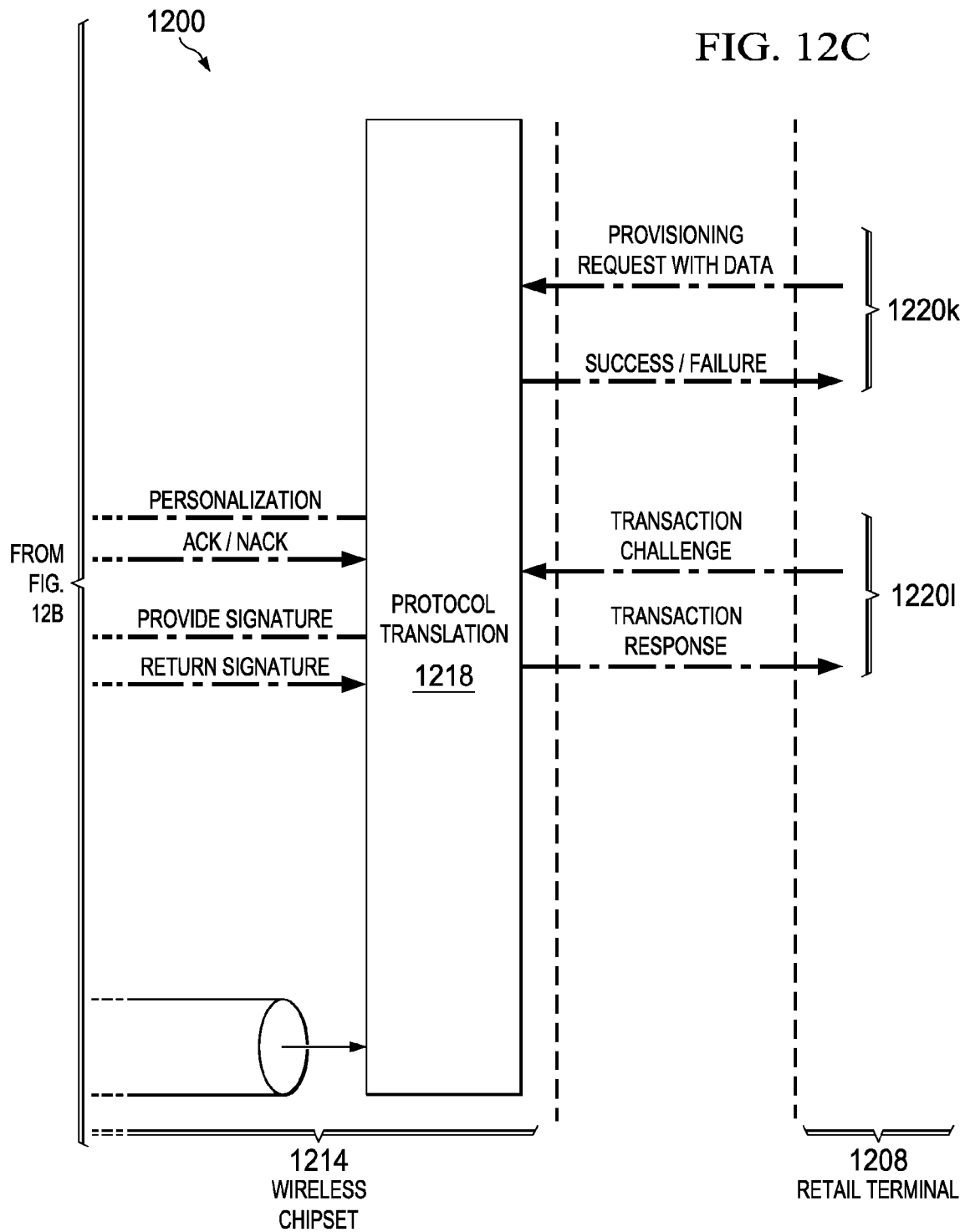

FIG. 12 is an example call flow 1200 in accordance with some implementations of the present disclosure. As illustrated, the flow 1200 includes a network 1202, a host device 1204, an intelligent card 1206, and a terminal 1208. The host device 1204 is configured to communicate with the network 1202 and includes a slot for insertion of the intelligent card 1206. The intelligent card 1206 is configured to transmit commands to and receive data from a user interface application 1210 executed by the host device 1210 and execute transactions independent of the host device 1210. The card 1206 includes a CPU 1212 for executing transactions and a wireless chipset 1214 for communicating with the terminal 1208. The CPU 1212 executes a host controller/API interface 1216 configured to transmits commands in a form compatible with the host device 1204 and convert data from the host device 1204 to a form compatible with the CPU 1212.

As illustrated, the flow 1200 may include multiple sessions 1220 between the host device 1204 and the card 1206 and between the card 1206 and the terminal 1208. The session 1220a illustrates a session managed by the card 1206 using the network capabilities of the host device 1210. In this example, the card 1206 transmits data for transmission through a cellular network connected to the host device 1204, and after receiving the cellular data, the host device 1204 transmits the data to the network 1202. In response to receiving data from the network 1202, the host device 1204 may automatically transmit the received data to the card 1206. In some implementations, the card 1206 may transmit a request for a device signature to the host device 1204 as illustrated in session 1220b. For example, the card 1206 may request the device signature during a bootstrapping process. The session 1220c illustrates that a user may submit commands to the card 1206 through the interface of the host device 1204. For example, the user may request that the disk display the user's transaction history through the interface of the host device 1204.

In some implementations, the card 1206 may receive a command to activate or deactivate the antenna through the host device 1204 as illustrated in session 1220d. For example, a financial institution may identify irregular transactions and transmit a command through the network 1202 to deactivate the card 1206. The card 1206 may authorize a user by requesting a PIN using the host device 1204. As illustrated in session 1220e, the user may submit a PIN to the card 1206 using the interface of the host device 1204, and in response to an evaluation of the submitted PIN, the card 1206 may present through the host device 1204 an indication that the user verification is successful or has failed. In some implementations, a user and/or financial institution may request a transaction history of the card 1206 as illustrated in session 1220f. For example, a financial institution may transmit a request for the transaction history through the network 1202 connected to the host device 1204, and in response to at last in the request, the card 1206 may transmit the transaction history to the financial institution using the network 1202 connected to the host device 1204. In some implementations, the user may present offline Web pages stored in the card 1206 as illustrated in session 1220. For example, the card 1206 may receive a request to present an offline Web page from the user using the host device 1204 and present the offline page using the URL in the request. In some implementations, data stored in the memory of the card 1206 may be presented through, for example, the host device 1204 as illustrated in session 1220h. For example, the user may request specific information associated with a transaction on a certain data and the card 1206 may retrieve the data and present the data to the user using the host device 1204. In addition, the user may write data to the memory in the card 1206 as illustrated in session 1220i. For example, the user may update transaction data with an annotation, and in response to at least the request, the card 1206 may indicate whether the update was a success or failure.

In regards to session between the card 1206 and the terminal, the flow 1200 illustrates the personalization session 1220k and the transaction session 1220l. In regards to personalization, a financial institution may personalize a card 1206 with user credentials, user applications, Web pages, and/or other information as illustrated in session 1220k. For example, the terminal 1208 may transmit a provisioning request to the card 1206 including associated data. The protocol translation 1218 may translate the personalization request to a form compatible with the card 1206. In response to at least the request, the CPU 1212 transmit an indication whether the personalization was a success or not using the protocol translation 1218. Prior to the terminal executing a transaction, the terminal 1208 may submit a transaction challenge to the card 1206 as illustrated in session 1220l. In this case, the card 1206 may identify a device signature of the host device 1204, present associated data to the user through the host device 1204, and transmit the signature to the terminal 1208 using the protocol translation 1218.

Figure 13:
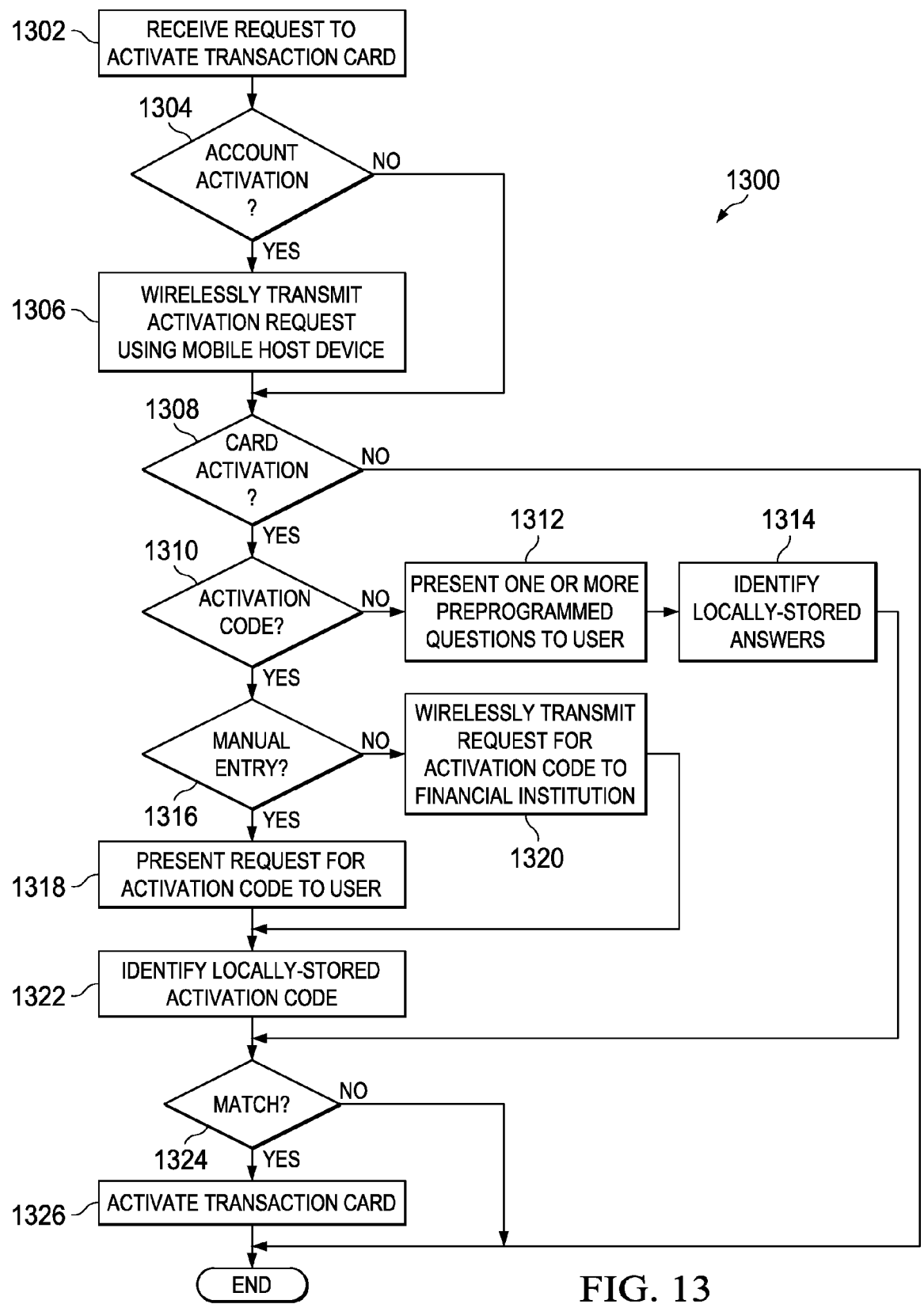
FIG. 13 is a flow chart illustrating an example method for activating a transaction card.

FIG. 13 is a flow chart illustrating an example method 1300 for activating a wireless transaction system including an intelligent card. In general, an intelligent card may execute one or more activation processes in response to, for example, a selection from a user. Many of the steps in this flowchart may take place simultaneously and/or in different orders as shown. System 500 or system 600 may use methods with additional steps, fewer steps, and/or different steps, so long as the methods remain appropriate.

Method 1300 begins at step 1302 where a request to activate a transaction card is received. For example, the user may select a graphical element displayed through the GUI 116 of a mobile host device 106 in FIG. 1. If an account activation is included at decisional step 1304, then at step 1306, a request to activate the associated financial account is wirelessly transmitted to financial institution using cellular radio technology of the host device. For example, the transaction card 104d of FIG. 5 may wireless transmit an activation request to the institution 506 using the cellular radio technology of the mobile host device 106d. If an account activation is not included, then execution proceeds to decisional step 1308. If card activation is not included, then execution ends. If card activation is included, then execution proceeds to decisional step 1310. If an activation code is not included, then at step 1312, one or more preprogrammed questions are presented to the user using the GUI of the host device. Returning to the initial example, the transaction card 104 may identify locally stored questions and present the questions to the user using the GUI 116 of the mobile host device 106. At step 1314, locally-stored answers to the programmed questions are identified. Returning to decisional step 1310, if an activation code is included, then execution proceeds to decisional step 1316. If the activation code is manually entered by the user, then at step 1318, a request for the activation code is presented to the user through the GUI of the mobile host device. In the initial example, the transaction card 104 may present a request for an activation code such as a string of characters to the user through the GUI 116 of the mobile host device 106. If the activation code is not manually entered by the user, then at step 1320, the transaction card wirelessly transmits a request for the activation code using the cellular radio technology of the host device. In the cellular example, the transaction card 104 may transmit a request to the financial institution using the cellular core network 602. In either case, the locally-stored activation code is identified at step 1322. If the locally stored information matches the provided information at decisional step 1324, then at step 1326, the transaction card is activated. For example, the transaction card 104 may activate in response to at least a user entering a matching activation code through the GUI 116. If the provided information does not match the locally stored information, then execution ends.

Figure 14:
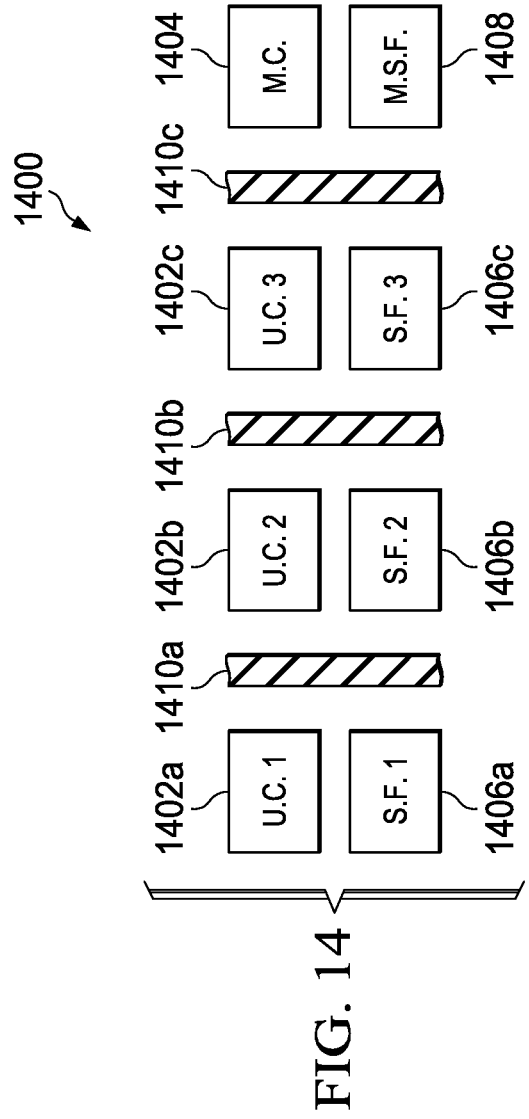
FIG. 14 is an example secure memory of an intelligent card for storing multiple user credentials.

FIG. 14 illustrates example secure memory 1400 in accordance with some implementations of the present disclosure. In general, the secure memory 1400 is configured to store user credentials for a plurality of different financial institutions. For example, each credential may be associated with a different user account (e.g., credit card, bank account). In the illustrated implementation, the secure memory 1400 includes user credentials 1402*a-c* and associated security frameworks 1406*a-c* separated by logical barriers 1410-*c*. In addition, the secure memory 1400 includes master credentials 1404 and a master security framework 1408. Each user credentials 1402 may be associated with a different user account and/or institution. For each user credential 1402 is assigned or otherwise associated with a security framework 1406. The security framework 1406 may be a payment application executed by the intelligent card in response to at least a selection of a user account. For example, the security framework 1406 may execute transactions in accordance with a specified format, protocol, encryption, and/or other aspects of an authorization request. In some implementations, the security framework 1406 can substantially prevent unauthorized access to user credentials. For example, each security framework 1406 may contain multiple keys that provide different levels of access. Each application within the framework 1406 may then be configured to be accessible according to particular security levels. In some implementations, the security frameworks 1406 may include different versions of a payment application for a type of financial instrument (e.g., Visa). In some implementations, the security framework 1406 may be identified using an application ID.

The master credential 1404 and the master security framework 1408 may enable financial institutions to store or update user credentials 1402 and associated security frameworks 1406. For example, creation of a new key within a security framework 1406 may be protected by the master framework's root key. The barriers 1410 may generate security domains between the different selectable user credentials 1402 and associated security framework 1406. For example, a financial institution may access user credentials 1402 and associated security framework 1406 for a managed user account but may be substantially prevented from accessing user credentials 1402 and associated security framework 1406 for different financial institutions.

In some implementations, the intelligent card (e.g., transaction card 104) can dynamically switch between user credentials 1402 and security frameworks 1406 in response to at least an event. For example, the intelligent card may switch to default user credentials 1402 and the corresponding security framework 1406 upon completion of a transaction. In some implementations, the intelligent card may switch user credentials 1402 and security frameworks 1406 in response to a selection from a user through, for example, the GUI 116 of FIG. 1. The intelligent card may typically switch between different user accounts based, at least in part, on different circumstances. In regards to adding additional user accounts, a user may manually enter user credentials 1402 using the GUI of a host device. In some implementations, the memory 1400 may be updated OTA using the cellular radio technology of the host device.

Figure 15:
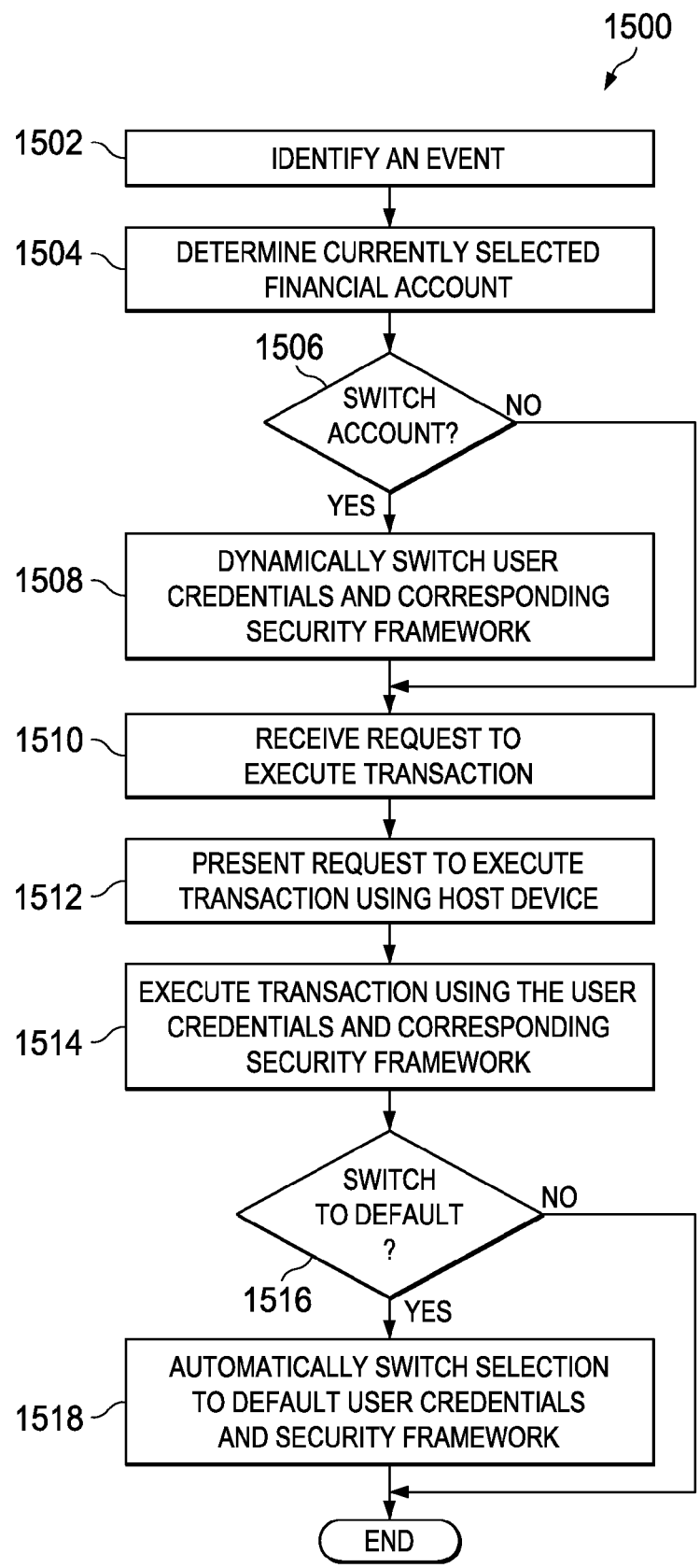
FIG. 15 is a flow chart illustrating an example method for dynamically switching between user accounts.

FIG. 15 is a flow chart illustrating an example method 1500 for dynamically switching between user accounts. In general, an intelligent card may dynamically switch between a plurality of selectable user credentials and associated security frameworks in response to at least an event. Many of the steps in this flowchart may take place simultaneously and/or in different orders as shown. System 100 may use methods with additional steps, fewer steps, and/or different steps, so long as the methods remain appropriate.

The method 1500 begins at step 1502 where an event is identified. For example, the transaction card 104 of FIG. 1 may determine that one or more of the following has been updated: network ID, phone number, MAC address, and/or other information. In some implementations, the event may include identifying one or more aspects of a transaction or potential transaction. For example, the transaction card 104 may determine an enterprise, type of enterprise, goods and/or services, types of goods and/or services, and/or other aspects. At step 1504, the currently selected user account is determined. In the example, the transaction card 104 may determine the currently selected user credentials and security framework. If the user accounts are switched at decisional step 1506, then at step 1508, the intelligent card dynamically switches the currently selected user account to a different user account based, at least in part, on the identified event. Again in the example, the transaction card 104 may dynamically switch between the plurality of selectable user accounts based, at least in part, on one or more events. Next, at step 1510, a request to execute is received. As for the example, the transaction card 104 may directly receive a wireless request to execute a transaction with the access point 514. In response to at least the request, a request to execute the transaction is presented to the user at step 1512. In the example, the transaction card 104 may present the request to the user through the GUI 116 of the mobile host device 106. In some implementations, the transaction card 104 may present the currently selected user account to user through the GUI 116. At step 1514, the request transaction is executed using the selected user credentials and corresponding security framework in response to at least a selection from the user. Again in the example, the transaction card 104 may execute the request transaction in response to at least a user selecting a graphical element in the GUI 116 of the mobile host device 106 and wirelessly transmit the authorization request directly o the access point 514. If the selection of account is switched to a default account at decisional step 1516, the intelligent card automatically switches the selected user account to default user credentials and corresponding security framework. If the selection is not switched to a default account, then execution ends.

A number of embodiments of the invention have been described. Nevertheless, it will be understood that various modifications may be made without departing from the spirit and scope of the invention. Accordingly, other embodiments are within the scope of the following claims.

What is claimed is:

1. A cover for a mobile device, comprising:
   side surfaces configured to be adjacent at least a portion one or more side surfaces of the mobile device;
   a rear surface configured to be adjacent at least a portion of a rear surface of the mobile device and connected to the side surfaces, the side surfaces and the rear surface form an opening that receives at least a portion of the mobile device, a first portion of at least one of the surfaces includes a connector for connecting to a port of the mobile devices; the connector includes a first interface configured to connect to the port of the mobile device and second interface configured to substantially duplicate a port to the mobile device;
   a physical interface included in at least one of the surfaces and configured to connect to a transaction device, wherein the mobile device is insertable into the cover; a circuit configured to connect the physical interface to the connector; and
   the transaction device configured to wireless communicate with access terminals.

2. The cover of claim 1, wherein the side surface and the rear surface are formed of flexible material.

3. The cover of claim 1, wherein the physical interface configured to connect to the transaction device comprises a SecureDigital (SD) slot.

4. The cover of claim 3, wherein the SD slot is a microSD slot.

5. The cover of claim 1, wherein the transaction device is integrated into the cover.

6. The cover of claim 1, the circuit further comprising a conversion module configured to convert signals between a form compatible with an external memory device and a form compatible with the mobile device.

7. The cover of claim 6, wherein the conversion module converts between a SD signal and a Universal Serial Bus (USB) signal.

8. The cover of claim 1, wherein the mobile device comprising an iPhone, the first interface comprising an iDock connector, the second interface comprising a port different than an iDock connector.

9. The cover of claim 1, the circuit further comprising a fingerprint scanner configured to provide a scanned fingerprint to an application that verifies an idenity of a user.

10. The cover of claim 1, wherein the circuit is integrated into at one of the surfaces.

11. The cover of claim 1, wherein one or more of the side surfaces are substantially arcuate to substantially maintain a shape and dimensions of the mobile device.

12. The cover of claim 1, further comprising the transaction device comprising:
   a physical interface configured to connect to a port of the mobile device, wherein the mobile host device includes a Graphical User Interface (GUI);
   a communication module configured to wirelessly receives Radio Frequency (RF) signals from and transmits RF signals to an access terminal;
   secure memory configured to store a plurality of selectable user credentials, wherein the user credentials execute transactions with access terminals and each are associated with different institutions;
   a user interface module configured to present and receive information through the GUI of the mobile host device; and
   a transaction module configured to dynamically switch between the plurality of selectable user credentials in response to at least an event and wirelessly transmit to the access terminal a response to a requested transaction including user credentials selected from the plurality of selectable user credentials.

13. The cover of claim 12, wherein the physical interface comprises at least one of a SecureDigital (SD) interface, a miniSD interface, a microSD interface, a MMC interface, a miniMMC, a microMMC, a firewire or a apple iDock interface, or a Universal Serial Bus (USB) interface.

14. The cover of claim 12, wherein the communication module executes the transaction independent of the mobile device.

15. The cover of claim 12, wherein the memory stores a plurality of security frameworks for the plurality of user credentials, the communication module executes the requested transaction using a security framework from the plurality of security frameworks corresponding to the selected user credentials.

16. The cover of claim 12, wherein the one or more events includes a user selecting a graphical element presented through the GUI of the mobile host device.

17. The cover of claim 12, wherein the user-interface module presents information associated with the requested transaction through the GIU of the mobile device.

18. The cover of claim 17, wherein the presented information is based, at least in part, on at least one of real-time content during the transaction, locally-stored offline content, or online content associated with the financial institution.

19. The cover of claim 17, wherein the user-interface module further configured to present a request for user identification including at least one of a Personal Identification Number (PIN), user ID and password, or biometric signature through the GUI of the mobile device; the processing module further configured to verify the submitted user identification with user identification locally stored in the secure memory prior executing the requested transaction.

20. The cover of claim 12, wherein the communication module selectively switches an RF antenna between an activate state and an inactivate state in response to at least an event.

21. The cover of claim 12, wherein the wireless RF signals comprise at least one of contactless signals, proximity signals, Near Field Communication (NFC) signals, Bluetooth signals, Ultra-wideband (UWB) signals, or Radio Frequency identifier (RFID) signals.

22. The cover of claim 12, wherein the communication module further comprises a protocol translation module further configured to translate signals between wireless protocols compatible with the retail terminal and an internal transaction application.

23. The cover of claim 12, further comprising a cryptographic module that configured to decrypt received signals prior to processing by the transaction module and encrypt at least part of the transaction response prior to wireless transmission.

24. The cover of claim 12, further comprising an authentication module configured to authenticate at least one of a network of the mobile host device, the mobile device, or a user.

25. The cover of claim 12, further comprising a bootstrap module configured to execute one or more authentication processes in response to at least insertion in the port of the mobile device.

26. The cover of claim 25, wherein the one or more authentication processes authenticates at least one of a network, a mobile device, or a user.

27. The cover of claim 12, further comprising an activation module configured to activate access to user credentials from the plurality of selectable user credentials and transmit to an associated financial institution a request to activate an associated user account.

28. The cover of claim 27, wherein access to user credentials from the plurality of selectable user credentials is activated based, at least in part, on a user manually entering an activation code using the GUI of the mobile device.

29. The cover of claim 12, the transaction module further configured to receive user selections through the GUI for the different user accounts associated with the plurality of selectable user credentials.

30. The cover of claim 12, the communication module further configured to receive requests to update the plurality of selectable user credentials through a wireless connection with a cellular core network or a wired connection with a broadband network.

31. The cover of claim 30, the communication module further configured to at least add new sets of user credentials or delete existing user credentials based, at least in part, on the update requests.

32. The cover of claim 12, wherein the plurality of selectable user credentials include a default user credentials, the communication module further configured to switch to the default user credentials in response to at least completing the requested transaction using a different one of the plurality of selectable user credentials.

33. The cover of claim 12, wherein the plurality of selectable user credentials include a default user credentials, the security modulo further configured to switch to a default user credentials in response to at least expiration of a period of time to complete a transaction using, non-default user credentials.

34. The cover of claim 12, wherein the plurality of selectable credentials are each loaded into the secure memory from a different institution.

35. The cover of claim 12, wherein the cover substantially maintains attributes of the mobile device.

36. The cover of claim 35, wherein the attributes include at least one of dimensions, accessibility to peripherals, charging, battery life, signal strength, access to the GUI, connectivity to wireless networks, or interface capability with clients.

37. The cover of claim 35, wherein the substantially maintained attributes do not void certification by regulatory authorities or a warranty of the mobile device.

* * * * *

UNITED STATES PATENT AND TRADEMARK OFFICE
CERTIFICATE OF CORRECTION

| | | |
|---|---|---|
| PATENT NO. | : 7,941,197 B2 | Page 1 of 1 |
| APPLICATION NO. | : 12/209810 | |
| DATED | : May 10, 2011 | |
| INVENTOR(S) | : Deepak Jain | |

It is certified that error appears in the above-identified patent and that said Letters Patent is hereby corrected as shown below:

Column 37, Line 50, in Claim 9, delete "idenity" and insert -- identity --

Column 38, Line 1, in Claim 12, delete "user interface" and insert -- user-interface --

Column 38, Line 40, in Claim 19, delete "device;" and insert -- device, --

Column 40, Line 9, in Claim 33, delete "modulo" and insert -- module --

Column 40, Line 11, in Claim 33, delete "using," and insert -- using --

Signed and Sealed this
Nineteenth Day of July, 2011

David J. Kappos
*Director of the United States Patent and Trademark Office*